（12）United States Patent
Davidson

(10) Patent No.: US 9,129,251 B2
(45) Date of Patent: Sep. 8, 2015

(54) RAIL-MOUNTED ROBOTIC INVENTORY SYSTEM

(71) Applicant: RFID Resolution Team, Inc., Sanford, NC (US)

(72) Inventor: William Edward Davidson, Durham, NC (US)

(73) Assignee: RFID RESOLUTION TEAM, INC., Sanford, NC (US)

( * ) Notice: Subject to any disclaimer, the term of this patent is extended or adjusted under 35 U.S.C. 154(b) by 0 days.

(21) Appl. No.: 14/466,272

(22) Filed: Aug. 22, 2014

(65) Prior Publication Data

US 2014/0361077 A1 Dec. 11, 2014

Related U.S. Application Data

(63) Continuation of application No. PCT/US2013/029958, filed on Mar. 8, 2013.

(60) Provisional application No. 61/609,808, filed on Mar. 12, 2012.

(51) Int. Cl.
*G06F 19/00* (2011.01)
*G06Q 30/00* (2012.01)
*G06Q 90/00* (2006.01)
*G06Q 10/08* (2012.01)
*G06Q 50/28* (2012.01)
*G06K 7/10* (2006.01)

(52) U.S. Cl.
CPC .......... *G06Q 10/087* (2013.01); *G06K 7/10366* (2013.01); *G06Q 10/08* (2013.01); *G06Q 50/28* (2013.01)

(58) Field of Classification Search
CPC .......... G06K 7/00; G06K 19/00; G06K 13/06; G06K 17/00; G06K 13/24; G06Q 30/00; G06Q 90/00
USPC .......................... 235/385, 375, 487, 483, 440
See application file for complete search history.

(56) References Cited

U.S. PATENT DOCUMENTS

| | | | |
|---|---|---|---|
| 4,973,971 A | 11/1990 | Sinsky et al. | |
| 5,892,971 A | 4/1999 | Danielson et al. | |
| 2003/0123341 A1 | 7/2003 | Ostwald et al. | |
| 2003/0149528 A1 | 8/2003 | Lin | |
| 2005/0134404 A1* | 6/2005 | Kajiya | 333/156 |
| 2006/0277269 A1* | 12/2006 | Dent et al. | 709/217 |
| 2007/0043469 A1* | 2/2007 | Draper | 700/231 |
| 2007/0279237 A1 | 12/2007 | Julian et al. | |
| 2008/0077511 A1* | 3/2008 | Zimmerman | 705/28 |
| 2012/0030070 A1 | 2/2012 | Keller et al. | |
| 2013/0166062 A1* | 6/2013 | Casey et al. | 700/216 |
| 2013/0310967 A1* | 11/2013 | Olson et al. | 700/214 |

* cited by examiner

*Primary Examiner* — Edwyn Labaze
(74) *Attorney, Agent, or Firm* — Coats & Bennett, PLLC

(57) ABSTRACT

Examples of a rail-mounted robotic inventory system are provided. The system includes a rail-mounted robot having an electronic tag reader configured to receive electronic tag data from electronic tags associated with inventory items. The system can include a navigation module configured to direct the rail-mounted robot along a rail through an inventory area, detect obstacles, and determine a position of the rail-mounted robot within the inventory area. The system can include an inventory identification module configured to receive the electronic tag data from the rail-mounted robot and identify and/or locate the inventory items in the inventory area based at least partly on the electronic tag data.

8 Claims, 13 Drawing Sheets

RAIL-MOUNTED ROBOTIC INVENTORY SYSTEM

RELATED APPLICATIONS

This is a continuation application of Patent Cooperation Treaty Application No. PCT/US2013/029958, filed Mar. 8, 2013, entitled "RAIL-MOUNTED ROBOTIC INVENTORY SYSTEM," which claims the benefit of priority under 35 U.S.C. §119(e) of U.S. Provisional Patent Application 61/609,808, filed Mar. 12, 2012, entitled "RAIL-MOUNTED ROBOTIC INVENTORY SYSTEM," the entire contents of both of which are hereby incorporated by reference herein and made part of this specification for all that they disclose.

BACKGROUND

1. Field

The disclosure relates generally to inventory and locating systems and methods, and more particularly to inventory systems and methods for reading electronic tags.

2. Description of Related Art

A common challenge in many businesses is keeping track of inventory. This challenge is especially intense when there is high product volume, a diverse product line, and multiple sources of product movement or inventory change. In recent years, electronic systems have helped to address this challenge. For example, inventory tracking has been aided by attaching small electronic tracking devices to products that can permit an electronic system to locate products and obtain inventory information about them.

In some systems, these electronic tracking devices comprise radio-frequency identification (RFID) technology. RFID devices use radio waves to transfer data from an electronic tag, called an RFID tag or label, to an RFID reader. The RFID tag may be attached to an object for the purpose of identifying and tracking the object to which the RFID tag is attached. Generally, the RFID tag includes a small radio frequency (RF) transmitter and receiver. An RFID reader transmits an encoded radio signal to interrogate the tag. The tag receives the message and responds with its identification information, which is stored electronically. Many RFID tags do not use a battery or external power source. Instead, the tag, known as a passive RFID tag, uses the electromagnetic energy transmitted by the reader as its energy source. For example, a passive RFID tag reflects the reader's transmission back to the reader and modulates that reflection. The RFID system design can include features for discriminating between several tags that might be within the range of the RFID reader.

SUMMARY

The systems, methods and devices of the disclosure each have innovative aspects, no single one of which is indispensable or solely responsible for the desirable attributes disclosed herein. Without limiting the scope of the claims, some of the advantageous features will now be summarized.

Conducting an assessment of inventory of RFID-tagged items can be performed by a person using a handheld RFID reader. In this process, the person moves through the store and uses the handheld reader to detect the RFID-tagged items. However, this method of inventorying electronic tags has a margin of error due to the manual nature of the operation. For example, a worker moving through a storage facility with an RFID reader can miss inventorying particular areas due to mistake, becoming distracted during the operation, forgetting about areas, or rushing to finish the operation. In addition, a worker performing an inventory operation in this manner does not record the location of the items. Moreover, manual inventorying of electronic tags does not provide a real-time inventory of the store and can be an inefficient use of time, money, and resources. The amount of time required for such an operation may be increased due to procedural requirements as well. Finally, manually inventorying a store in this fashion may interfere with the normal course of operations of the store or warehouse.

Automated systems for detecting electronic inventory tags can be used to provide consistent results and near real-time inventory information. Automated systems can utilize arrays of overhead readers and exciters, arrays of overhead bidirectional phased array systems and/or smart shelving and smart hanging rails. These automated systems can, to varying degrees, give the location of any given item in the store.

However, some overhead automated systems may cost significantly more than a handheld reader and a full time clerk even for comparatively small facilities. Some types of automated systems do not scale well, with costs climbing rapidly as the store size and population of items grows. Some automated systems can also require considerable setup and infrastructure to install, which is expensive, and can conflict with the store's decor. In some cases the system may need to be re-installed or calibrated if the store display scheme is changed significantly, once again increasing the cost to run and maintain the system.

The read efficacy of stationary systems, such as some overhead automated systems, can be affected by shielded tags, tag orientation, distance to the tags, intervening obstacles, and the like. In a moving system, the relative angle between the emitted radio frequency (RF) signal and the electronic tag to be read is dynamic, changing over time, so that even if the tag is shielded at one angle it may be read as the system continues its motion. While some of these issues with stationary systems can be mitigated by a carefully designed installation or by adding more antennas to the stationary system, these solutions diminish the flexibility of product storage and display and further increase costs.

When using low-cost passive electronic tags, handheld readers can be used due to their effectiveness and low cost. However, the advantages of handheld readers are diminished in environments where some items are located at heights that are out of range for a human using a handheld reader. Environmental hazards may also reduce the desirability and effectiveness of using handheld readers. For example, in a warehouse with high rack shelving there may be a lot of equipment moving around narrow aisles with limited sight, such as high-low forklifts. The dangers, distances, and distractions present in such environments can render handheld readers less effective.

Readers can be placed on some equipment to attempt to solve some of the problems described above. For example, readers can be placed on forklifts to record what the forklift is carrying and where it deposits the item. This approach can be effective with the limitation that the inventory is built over time, but the inventory can deviate if items are moved without properly instrumented equipment. Moreover, if any historical inventory data is missing, there may be no way to obtain an absolute inventory.

Some inventory systems can be implemented using floor-based mobile readers. These systems may not be able to read items that are located at various heights due to the range of the readers. Increasing the height of the floor-based mobile reader to increase the vertical read range may result in a system that is unstable and dangerous. In addition, floor-based mobile readers may interfere with the normal operations of a retailer, warehouse, store, or other similar location.

Therefore, in some embodiments a rail-mounted robotic inventory and localizing system can provide a relatively low-cost mobile system, effectively inventory and localize items, scale well with increasing inventory and/or store size, and reduce interference with normal store operations. The system can include an inventorying/localizing manager, a rail-mounted robot, and a robotic base station. The system can be configured to communicate over a network and receive data from external sources. The rail-mounted robot can be mounted on a rail or rail system that guides the robot along a path wherein the robot inventories and/or locates items within its range along the path. The rail system can define a route through a store that changes in three dimensions. The rail system can be mounted, for example, to shelving units, display cases, fixtures, walls, freezers, behind lighting valances or soffits, or any combination of these.

In some embodiments, an inventory system can utilize one or more aspects of the inventions disclosed herein without being mounted to a rail. Many types of rail-less moving systems can be utilized, such as wire-based systems or free-roving systems. As illustrated herein, many systems can comprise an antenna that is moveable in a generally horizontal direction. Some embodiments can comprise antennas that can alternatively or additionally be moveable in a generally vertical direction. Some embodiments can be elevated above the product level, and some embodiments can be positioned generally at or below the product level.

In some implementations, the system can scale relatively easily with the size of the region to be inventoried and/or with the number of items to be inventoried. The cost to run and maintain the system may not increase significantly when adding additional areas to be covered or additional items to be inventoried or located. In some implementations, the system can be installed without utilizing a professional installer and/or performing a calibration. In some implementations, the system is automated with relatively little or no input from users or operators during inventory operations. In some implementations, the system can inventory and localize items associated with standard, unmodified passive RFID tags.

In some embodiments, the system includes a rail-mounted robot configured to traverse an elevated rail or rail system (e.g., positioned above most or all products to be inventoried) and to substantially avoid interference with equipment and/or humans. For example, the rail system and rail-mounted robot can be situated on high-rack shelving at a height sufficient to be above most equipment, such as a high-low forklift. In some implementations, the rail-mounted robot includes sensors and components configured to provide obstacle detection and avoidance capabilities. In some embodiments, the robot can provide its absolute location within a store and determine the location of tags and associated items within the store. In some embodiments, the rail-mounted robot includes a steerable antenna, such as a linear phased array or a matrix of antenna elements.

BRIEF DESCRIPTION OF THE DRAWINGS

The drawings are provided to illustrate example embodiments described herein and are not intended to limit the scope of the disclosure. Throughout the drawings, reference numbers may be re-used to indicate general correspondence between referenced elements.

FIG. 12 shows an example embodiment of a rail-mounted robotic inventory and localizing system where a rail-mounted robot is situated above a refrigerator or freezer unit used for items such as meat, dairy products, frozen goods, and the like.

FIG. 13 shows an example embodiment of a rail-mounted robotic inventory and localizing system where a rail-mounted robot is situated above a storage and/or display unit for items such as DVDs, CDs, cards, and the like.

DETAILED DESCRIPTION

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection of certain inventions is defined by the claims. For ease of reference, the description below uses the term "store" in discussing the rail-mounted robotic inventory/locating system. The term "store" can refer to any type of area where products are located, including but not limited to storage areas, warehouses, retailer facilities, etc.

Examples of Rail-Mounted Robotic Inventory/Locating Systems

Figure 1:
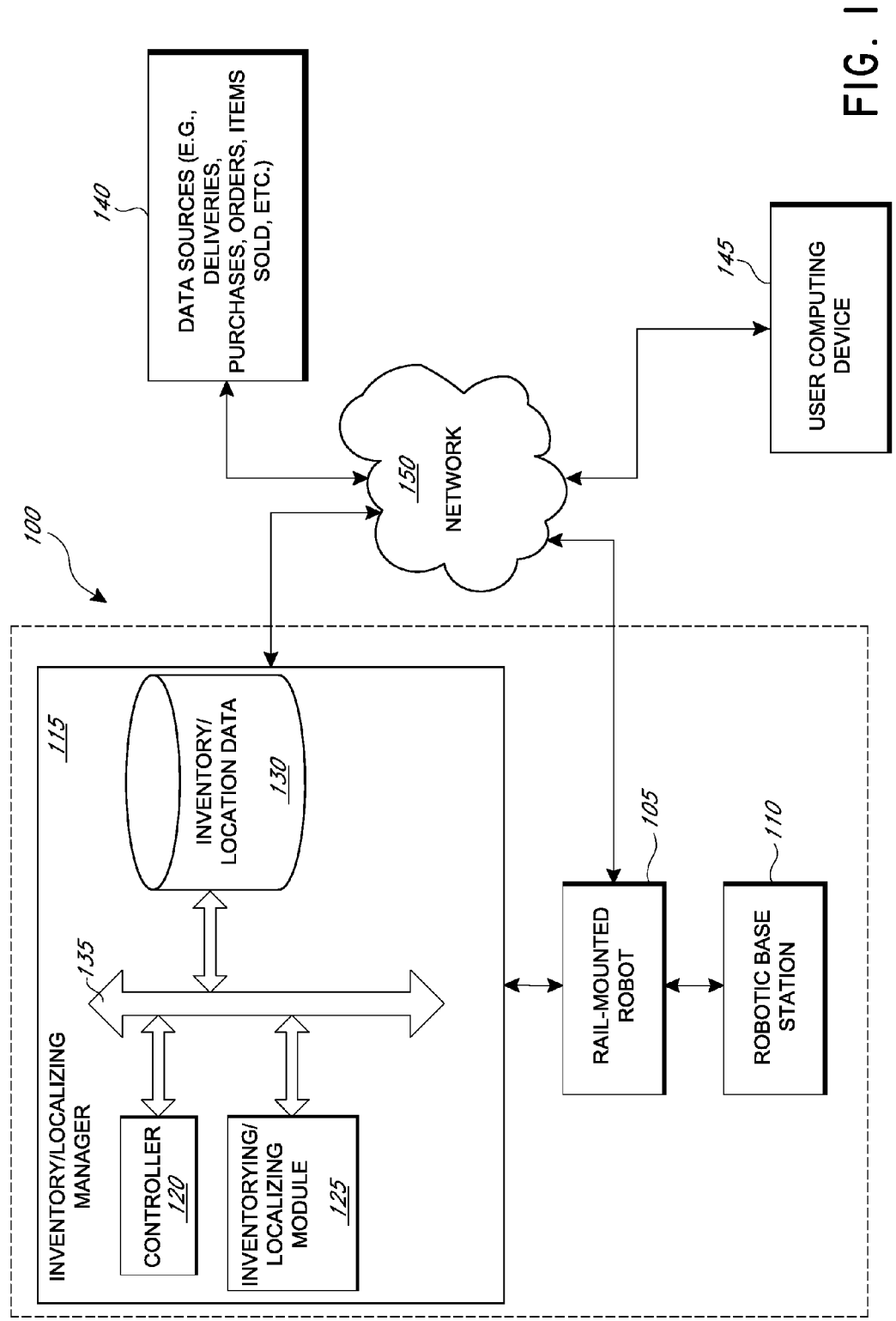
FIG. 1 shows a schematic block diagram of some components of an example rail-mounted robotic inventory and localizing system for inventorying and/or locating items in a store (e.g., department store, grocery store, etc.), warehouse, retail establishment, storage area, or other similar location.

FIG. 1 is a block diagram of a rail-mounted robotic inventory and localizing system 100 for inventorying and/or locating items in a store (e.g., department store, grocery store, etc.), warehouse, or other storage area. The system 100 can include a rail-mounted robot 105, a robotic base station 110 and an inventory/localizing manager 115. Components of the system 100 can communicate over a network, direct link (e.g., wired or wireless), or other communications link. In addition, the system 100 can be connected to external systems, devices, or data sources via a network 150 or other communications link. In some embodiments, the rail-mounted robot 105 is configured to communicate directly over the network 150.

The rail-mounted robotic inventory/locating system 100 can include a rail-mounted robot 105 that is an electro-mechanical machine that is controlled by computer and/or electronic programming. In some embodiments, the rail-mounted robot 105 can be autonomous, semi-autonomous, or remotely controlled. The robot 105 can include one or more memory devices, processors, sensors, scanners, transmitters, receivers, power systems (e.g., batteries or wireless charger), location tracking systems, and/or motors. The robot 105 can be configured to traverse a rail or system of rails. Rails can be, for example, hung from a cantilever clipped onto standard high-rack framing, hung from a cantilever bolted to a wall or other vertical surface, hung below cross-beams between shelving units, hung from a ceiling, suspended behind a lighting valance or soffit, suspended from two or more cables, mounted directly to a horizontal or vertical surface, and/or suspended from existing cranes or gantries. In some embodiments, the rail is mounted directly to a shelf, wall, fixture, and/or flat surface without the use of a rail support mechanism. Mounting the rail without a rail support mechanism can reduce or minimize interference with normal store operations. For example, a rail mounted directly to a high-rack shelving unit without the use of a cantilever support structure or the like can be situated relatively close to the shelving. Thus, a person, a high-low forklift, lift tables, cherry picker, and/or other equipment can perform their normal functions with relatively little or no obstruction caused by the rail.

The inventory manager 115 can include one or more controllers 120, an inventorying/localizing module 125 for performing inventory and localizing operations, and data storage 130 for storing inventory and/or location data, such as a list of inventory items, expected inventory items, previous inventory records (e.g., inventory lists from past days), expected location of inventory items, previously recorded locations for items, and other related inventory and/or location data. Data storage 130 can be configured to store information read by the robot 105 for analysis. The components can be connected via a communications medium 135, such as a system bus or network, which can be the same network 150 described above or a different network. For example, the communications medium 135 may be a local area network while the network 150 is wide area network. The components of the rail-mounted robotic inventory/locating system 100 can be part of a single computing device or part of one or more computing systems comprising one or more computing devices. For example, in some embodiments, the inventory/localizing manager 115 can be part of the rail-mounted robot 105 or robotic base station 110. In some embodiments, the inventory/localizing manager 115 can be a separate device or devices.

The inventory/localizing manager 115 can be in communication with external data sources 140, which can include store or warehouse data. For example, the inventory/localizing manager 115 can receive inventory-change data, such as data regarding deliveries, purchases, invoices or orders, reports on items, and other inventory-related data from the data sources 140. The inventory/localizing manager 115 can store that inventory-change data in its data storage 130 and can use such data during inventorying/localizing operations. For example, the inventory/localizing manager 115 can receive data associating electronic transmitters or transponders, such as RFID tag identifiers, with particular items, which data the inventory/localizing manager 115 can use to identify and locate items in the storage area.

In some embodiments, the rail-mounted robotic inventory and localizing system 100 can be configured to provide inventory and location information for passive RFID tags. The system 100 can be configured to read standard passive or active RFID tags without modifying the tags. The location information can include the position of the passive RFID tag in three dimensions. Passive RFID tags can be less expensive than corresponding active RFID tags and systems that utilize passive RFID tags can be less expensive to implement due in part to the low cost of passive tags. Thus, configuring the system 100 to provide inventory and three-dimensional location information from passive RFID tags can result in a relatively low-cost inventory and localizing solution.

A user computing device 145, such as a desktop computer, laptop, smart phone (e.g., an IPHONE or ANDROID device), tablet or other mobile device, may be able to communicate with the rail-mounted robotic inventory/locating system 100 via the network 150. In some embodiments, the user computing device 145 receives reports, status updates, and/or other messages from the system 100. For example, the system 100 can send an alert to a store manager that the number of units of a particular inventory item is running low. The store manager can then re-order the item by communicating an order to the store's suppliers. In some embodiments, the system 100 may automatically place an order with suppliers. In some embodiments, the system 100 can provide updates on inventory operations to the user computing device 145 that allow the user to track the progress of the inventory operation. This can allow a centrally located manager to monitor one or multiple overhead antenna inventory/locating systems 100 remotely.

In some embodiments, the user computing device 145 can provide instructions to the rail-mounted robotic inventory/locating system 100, such as initiating an inventory operation for a region covered by the rail-mounted robot, or for some specified geographical area within that region, or for some specified type of product or category of products within that region; setting a time for an inventory operation; initiating or cancelling an inventory operation; as well as other commands. For example, a store manager, clerk, or warehouse employee can remotely program the system 100 to perform inventory operations. This can be useful when the inventory operations are done after closing, as the person can program the system 100 from home or some other location away from the store.

In some embodiments, the rail-mounted robot 105 can dock with the robotic base station 110 to charge. In some embodiments, the robot 105 and the robotic base station 110 have communication interfaces, such as wireless transmitters and receivers or wired data interfaces, for communicating with each other. For example, the robot 105 may communicate RFID readings or inventory data that it collects during an inventory operation to the robotic base station 110. In turn, the base station 110 can report those readings or inventory data to the inventory manager 115. In some embodiments, the robot 105 can communicate with the inventory/localizing manager 115 directly. In some embodiments, the robot 105 communicates with the robotic base station 110 and/or the inventory/localizing manager 115 while it is performing inventory operations. In some embodiments, the robot 105 reports the results of inventory routines after the routine is completed.

In some embodiments, some or all of the functions of the base station 110 are integrated into the robot 105. For example, the robot 105 may be able to communicate directly with the inventory manager 115 and the robot 105 directly reports the inventory data to the inventory manager 115. In some embodiments, some or all of the functions of the inventory manager 115 may be integrated into the robot 105. For example, the robot 105 may analyze readings and determine the current inventory in the store.

In some embodiments, the rail-mounted robotic inventory and locating system 100 can be configured to record a relatively large number of tags without adding additional rail-mounted robots 105. The system 100 can be configured to continue to function satisfactorily as the number of tags to be read increases and/or the length of the rail increases thereby increasing the inventory and localizing output without substantially increasing the cost of implementing and operating the system 100.

Using a rail system and rail-mounted robot 105 can provide many advantages. One advantage is that the system may be installed with relative ease. For example, the rail system can be attached to a fixture or structure and the rail-mounted robot 105 can be secured to the rail system. The robot 105 can then traverse the rail system and conduct inventory and/or location operations without professional installation or calibration. Another advantage is that the cost and operation of the rail-mounted robotic inventory and locating system 100 may be substantially independent of the area to be covered. For example, the system 100 can be configured to cover a relatively small or large area depending on the track routing. Another advantage is that a single robot may be capable of covering a desired region. For example, the rail system can be configured to cover a warehouse such that all shelving or other storage areas are within the range of the robot 105 at least at one point along its path. Another advantage is that the system 100 may adapt relatively easily to a change in floor plans. For example, the system 100 can adapt to a new floor plan or store layout by changing the routing of the rail system through the store. Similarly, extending the robot's coverage can comprise adding rails to the existing rail system. Another advantage is that the robot 105 may be high off the ground depending on the positioning of the rail system. For example, the robot 105 can be positioned off the ground to provide overhead coverage and/or the ability to detect items on high-rack shelving. Another advantage is that the rail system may be configured to route the robot 105 in three dimensions.

Example of a Rail-Mounted Robot

Figure 2A:
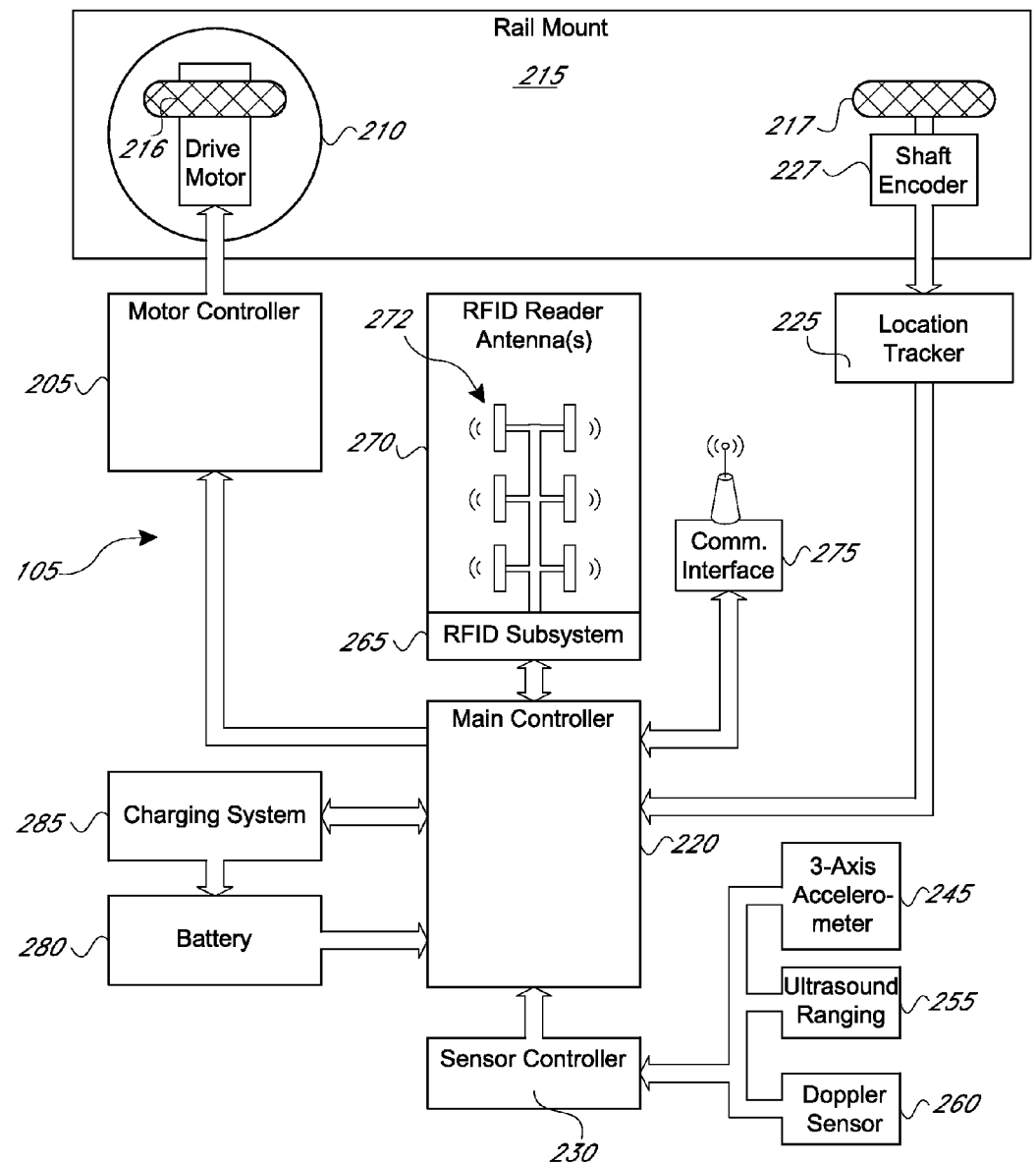
FIG. 2A shows a schematic block diagram of an example rail-mounted robot in the inventory and localizing system from FIG. 1.

FIG. 2A shows a schematic block diagram of an example rail-mounted robot 105 in the inventory and localizing system 100 from FIG. 1. As illustrated in FIG. 2A, the robot 105 can include many components that perform together to provide the desired inventorying and localizing functionality. In some embodiments, the robot 105 includes two subsystems: a navigation system and an inventorying/localizing system. The robot 105 may also have other subsystems, such as a power system and/or a communication system.

Navigation System

In some embodiments, the robot 105 can be configured to traverse a rail or rail system, limiting the robot to movement along the rail or rail system. In some embodiments, the rail or rail system, or other movement system, is linear, contains turns, and/or changes elevation. In some embodiments, the robot 105 is limited to movement in one dimension, i.e. it can either travel forward or backward along the rail. The illustrated embodiments provide examples of one-dimensional readers, but multi-dimensional readers can also be used. For example, an antenna can move along multiple rails that are linked at transitions, such as points or bridges connected between or among multiple separate shelving units at different locations in a store. In some rail-less embodiments, a moveable antenna can be configured to climb or otherwise move along a standard shelf with no additional rail attachments required. The navigation system of the robot 105 can be configured to control movement and provide information related to the location of the robot 105. The system 100 can utilize the position of the robot 105 to determine the absolute or relative location of items it reads or detects, as described more fully herein.

In the illustrated embodiment in FIG. 2A, the rail-mounted robot 105 includes a motor controller 205 that controls a drive motor 210 that drives one or more wheels, gears, cogs, tires, or other locomotion devices. In some embodiments, the drive motor 210 includes one or more electric motors that can be powered by a power source, such as a battery (e.g., a rechargeable battery). The drive motor 210 can cause a drive wheel 216 to rotate and propel the robot 105 along a rail. In some embodiments, the robot 105 includes an idler wheel 217 that is not actively driven. Some embodiments can use additional drive wheels, idler wheels, different wheel configurations, or other locomotion devices.

The rail-mounted robot 105 can include a main controller 220 that can determine the direction (e.g., forward or backward) and/or speed that the robot travels. The main controller 220 can communicate with the motor controller 205 to pass on movement instructions such as, for example, speed, direction of movement, movement duration, or any combination of these.

The rail-mounted robot 105 can include hardware 215 configured to attach, affix, or secure the robot to a rail. The rail-mount 215 can comprise components that are configured to releasably mate with the rail or rail system. The rail-mount 215 can comprise components that are configured to position one or more wheels such that they remain substantially in contact with the rail while the robot 105 is in operation. The rail-mount hardware 215 can be any component or combination of components that provides sufficient support to the robot 105 when mounted on the rail such that it remains attached, affixed, or secured to the rail. For example, the rail-mount 215 can be a hinged system attached to the wheels 216, 217 configured to allow the robot 105 to be removed from the rail or rail system when open and substantially prevent the robot 105 from being removed when closed. As another example, the rail-mount 215 can comprise a support structure that is configured to allow the rail to pass through the structure substantially unimpeded and position the wheels 216, 217 to be in contact with the rail to secure the robot 105 to the rail.

Navigation System—Location Tracking

The rail-mounted robot 105 can include a location tracker 225 that determines the current location of the robot 105. The location tracker 225 can report the position of the robot 105 to the main controller 220. The main controller 220 can pass this information to the inventorying/localizing system for determining an absolute position of detected items, as more fully described herein.

In some embodiments, the location tracker 225 includes information from the shaft encoder 227 to calculate a distance traveled along a track or rail. If the routing and position of the track or rail is known, the location tracker can translate the linear distance along into an absolute position. In some implementations, a user or operator enters the track or rail routing into the rail-mounted robotic inventory and localizing system 100. The system 100 can use the information from the shaft encoder 227 and the entered track routing information to calculate the position of the robot 105. In some implementations, there is an absolute reference point, reference contact at a point in the track, such as an endpoint, and/or waypoints along the track allowing the robot 105 to resynchronize itself to an absolute position at these points. For example, when the robot 105 returns to the robotic base station 110 for charging, the robot 105 can resynchronize the location tracker 225 to the known absolute position of the base station 110. The waypoints can be, for example, mechanical or electrical switches, optical indicators, proximity sensors, RFID tags, etc., or any combination of these. The robot 105 can interpolate its position between the waypoints or reference contact point using the shaft encoder 227 or by reading an optical linear scale along the track. For example, the track can include an optical linear scale with A and B quadrature channels such that an optical linear encoder on the robot can be used to calculate the position based on the scale.

In some embodiments, the location tracker 225 can use wireless signals to determine the position of the robot 105. For example, the location tracker 225 can include a receiver that receives a signal from the robotic base station 110, which is typically at the robot's starting location, and can use that signal to determine the robot's 105 location (e.g., by triangulation, signal strength, or other determination method). As another example, the location tracker 225 can use an existing wireless locating system, such as a system of RF beacons used for locating forklifts or automated guided vehicles. The absolute position of the robot 105 can be determined without reference to the track or rail routing when using wireless signals as described. Thus, the routing can be changed without affecting the ability of the location tracker 225 to determine the position of the robot 105.

In some embodiments, the location tracker 225 includes a dead reckoning system that tracks movement of the robot 105 to determine the robot's position from a starting point. The dead reckoning system can use 3-axis accelerometers and/or magnetometers to determine the orientation of the robot 105 and any change of direction in the motion of the robot 105. The dead reckoning system can use shaft encoder 227 on the idler wheel 217 to measure the number of revolutions of the wheel and estimate the distance traveled by the robot 105. The dead reckoning system may also collect speed, direction, and movement duration data from the motor controller 205. The dead reckoning system can then use the distances, robot orientations, and/or directions of travel to estimate the current position of the robot 105. In some embodiments, the shaft encoder 227 determines the distance traveled by calculating the product of the number of rotations of the wheel and the circumference of the wheel. In some embodiments, waypoints are used as described above with the dead reckoning system to calculate the position of the robot. The dead reckoning system can be used to determine the absolute position of the robot 105 regardless of changes in the track routing if there is at least one waypoint that is fixed as an absolute reference point. The absolute position of the robot 105 can be determined without reference to the track or rail routing when using the dead reckoning system as described. In some embodiments, the location tracker 225 can combine the dead reckoning system with the wireless signal based location system.

The rail-mounted robot 105 can use other navigation technologies or a combination of navigation technologies to determine its position. While the navigation technologies described above advantageously require minimal setup and/or do not use additional infrastructure in order to simplify operation of the robotic inventory system 100, other navigation technologies can also be used. In some embodiments, the location tracker 225 uses electronic communication technologies such as computer vision-devices, lasers, radar, or acoustic information to determine the position of the robot 105. In some embodiments, the location tracker 225 includes a laser transmitter and receiver. The laser emits radiation that reflects off of retro reflective tape mounted on the walls, floors, shelves, rail endpoints, or other surfaces of the store. The angle and/or distance of the reflected laser radiation can be used to identify the location of the robot 105. For example, the robot 105 can have a reflector map including the locations of the markers stored in memory and can determine its position based on errors between expected and received measurements.

Navigation System—Obstacle Detection and Reaction

The rail-mounted robot 105 can include a sensor controller 230, which can communicate with various sensors to provide obstacle avoidance and/or to determine whether a zone is occupied by an obstacle such as an item of inventory, a human, and/or equipment. The sensor controller 230 can communicate the sensor readings to the main controller 220, which can utilize the readings to navigate the robot 105. The robot 105 can navigate to a zone that has been designated as a "safe parking" zone or to a segment along the rail determined to be free from obstacles. For example, using the sensor controller 230, the robot 105 can detect that there is a forklift loading a pallet onto a shelving unit. The robot can then decide that its path would interfere with this operation. In such a situation, the robot 105 can be configured to move to a zone where it does not interfere with normal store operations, or a "safe parking" zone. In some embodiments, the robot 105 can be configured to halt upon encountering an obstacle until reset after a safety inspection.

The sensors can include a 3-axis accelerometer 245 that can determine if a collision with an obstruction has occurred. The mobile robot 105 can include low-cost sensors, such as, for example, ultra-sound ranging sensors 255, Doppler sensors 260, three-axis magnetometers, and/or various other sensors. The mobile robot 105 can include a video camera (e.g., normal, low-light, infrared, and/or combination of the above) as an operation recording/verification sensor and to aid in obstacle avoidance.

The mobile robot 105 can also use its RFID reader 270 as an obstacle sensor. For example, the floor area and/or a lower region of active zones can include RFID tags set at regular intervals. The RFID tags can be configured to be identifiable as locating tags with a sequential number or some other pattern. The robot 105 can read the locating tags and can determine if the zone is an active zone. The robot 105 can also determine whether any tags in the sequence or pattern are not visible to the reader 270 which could indicate that the zone is occupied or busy. For example, the locating tags can be mounted on or under the floor. If a tag is not read, it can indicate the presence of an obstruction such as a person or some equipment blocking the tag. In such a situation, the robot 105 can identify the zone where there are one or more tags as an occupied zone. In some embodiments, the robot 105 can determine the location of the occupied zone. The robot 105 can report the determined location to the system 100 and/or a user computing device 145.

In some embodiments, the robot 105 can train itself over multiple operations to recognize abnormal conditions. For example, the robot 105 can compare current tag readings to previous tag readings. Any difference in the readings can indicate some activity such as missing tags due to shielding by equipment or new tags being carried in by forklift. The robot 105 can be configured to stop in response to such a determination and use other sensors to confirm if there is activity and the distance to the activity. The robot 105 can be configured to retreat, stop, and/or move to a "safe parking" zone depending on these determinations to avoid interfering with normal store operations.

Inventorying and Localizing System

In addition to navigation, the main controller 220 can manage and/or control the rail-mounted robot's inventorying and localizing system. The robot 105 can include an RFID subsystem 265 having an RFID reader 270 and one or more antennas 272. The RFID reader 270 can be capable of reading a variety of RFID tag protocols, including both active protocols and passive protocols, such as EPC GEN-2, ISO-18000-6, or ISO-18000-7. The main controller 220 can be in communication with the RFID subsystem 265 in order to obtain inventory and/or location data.

In some embodiments, the RFID reader 270 includes one or more antennas 272. The antenna 272 can be steerable, extendable, omni-directional, directional, isotropic, or some other configuration. The antenna can comprise a single antenna element, a linear phased-array of antenna elements, or a matrix of antenna elements. The antennas 272 can be patch antennas, a phased array, a bi-directional phased array, dipoles, or any combination of these. Steerable or extendable antennas may help in providing directional information related to detected tags, permitting a rough determination of their location based on phase angle, received signal strength indicator value, and/or detected angle from the antenna, as more fully set forth herein. In some embodiments, the robot 105 includes an array of antennas 272 coupled to a high-sensitivity RFID reader 270 with phase angle reporting, such as a Sirit IN610 reader.

The reader 270 can be configured to detect an electronic tag. The electronic tag can be an active, passive, or battery-assisted passive RFID tag. The tag can include an integrated circuit and an antenna. The integrated circuit on the tag can be configured to modulate and demodulate the signal from the antennas; store information such as tag identification, stock number, batch number, or the like; and/or collect the transmitted power from the antenna to assist in transmitting a response to the reader's interrogation. The tag can be configured to operate in a low-frequency band, a high-frequency band, an ultra-high-frequency (UHF) band, or other RFID frequency band. For example, a passive RFID tag can be configured to send and receive UHF signals having a frequency of at least about 902 MHz and/or less than or equal to about 928 MHz, or a frequency of at least about 865 MHz and/or less than or equal to about 870 MHz.

Communication System

The robot 105 can also include a communication interface 275 for receiving and/or transmitting data over a communications link. The communications link can be via a wired and/or wireless communication link, such as Ethernet, Bluetooth, 802.11a/b/g/n, infrared, universal serial bus (USB), IEEE 1394 interface, or the like. The robot 105 can use the communication interface 275 to report the inventory data it collects, for example, to the inventory manager 115.

Power System

The rail-mounted robot 105 can include a power system, having a battery 280 and a charging system 285. In some embodiments, the charging system 285 allows for automatic or opportunistic charging of the robot 105 to provide continuous operation and/or to maintain a full charge when not in use. For example, the robot 105 can be configured to return to the robotic base station 110 of FIG. 1 for charging when idle.

In some embodiments, the base station 110 is a stationary reference point for recalibration or registration of the robot's position. For example, the robot 105, if using dead reckoning, can use its relative position to the base station 110 and the base station's known location to determine the robot's absolute location in the store.

Example Embodiment of a Rail-Mounted Robot

Figure 2B:
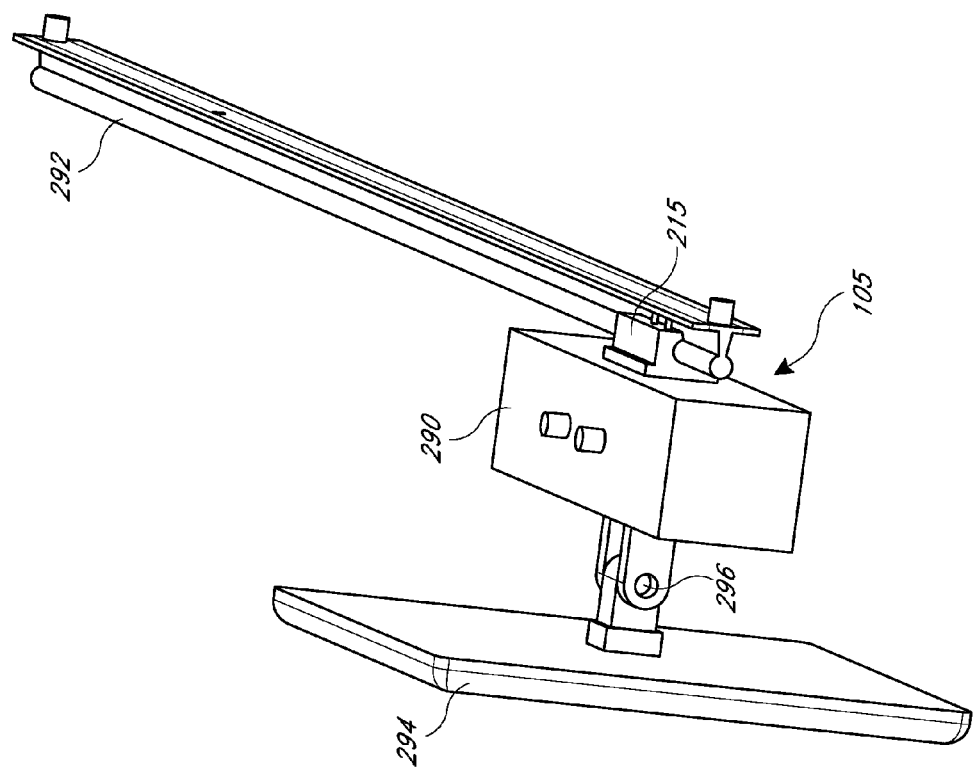
FIG. 2B shows an example embodiment of a rail-mounted robot.

FIG. 2B shows an example embodiment of a rail-mounted robot 105. The robot 105 can be configured to be mounted to a rail 292 such that it can traverse the rail either forward or backward. In some embodiments, the robot 105 can be configured to move in other directions. The robot 105 can include a rail mount 215 configured to substantially secure the robot 105 to the rail 292. The robot 105 can be oriented on the rail 292 to detect items situated in a desired region relative to the rail. For example, the robot 105 can be oriented to detect items on shelving opposite the rail-mounted robot 105, items positioned above the rail 292, items positioned below the rail 292, items on either side of the rail 292, and/or items positioned in any direction relative to the rail 292.

The rail 292 can be, for example, hung from a cantilever clipped onto standard high-rack framing, hung from a cantilever bolted to a wall or other vertical surface, hung below cross-beams between shelving units, hung from a ceiling, suspended behind a lighting valance or soffit, suspended from two or more cables, mounted directly to a generally horizontal or generally vertical surface, mounted directly to a wall or the end of a shelving unit, and/or suspended from existing cranes or gantries. The rail 292 can be configured to provide support to the robot 105 to substantially fix it in a relative orientation to the rail, for example horizontally, vertically, or in some other direction. The rail 292 can be configured to allow the robot 105 to travel beneath, above, to the side, or some other direction relative to the rail 292. In some embodiments, the rail 292 can be configured to provide guidance and support but not to provide propulsion to the robot 105 to move it along the rail. For example, the robot 105 can contain drive control and intelligence and can be self-propelled, eliminating the need for the rail 292 to have a rail controller or similar active functionality. In some embodiments, the robot 105 and the rail 292 can be configured to include one or more roller chains and mating cogs or sprockets to serve as a means of traversing the rail 292. In some embodiments, the rail 105 is smooth and the robot 105 can have one or more wheels and can traverse the rail 292 by way of friction. In some embodiments, the rail 292 can provide propulsion to the robot 105. The rail 292 can include, for example, a monorail system, a chain conveyor system, a roller conveyor system, a belt conveyor system, or any combination of these.

The robot 105 can include a housing 290 to substantially enclose and/or protect its components. The components of the robot 105 can include those described herein in reference to FIG. 2A. The robot 105 can be equipped with one or more antennas 272 enclosed within the housing 290 and/or within an antenna housing 294. The antenna housing 294 can be configured to enclose and/or protect the antennas. In some embodiments, the antennas are not situated within the antenna housing 294. The antenna housing 294 can be attached to the housing 290 using a support structure 296. The support structure 296 can be configured to substantially secure the antenna housing 294 in various orientations according to the desired functionality of the robot 105. The support structure 296 can be configured to be stationary, it can be movable by applying a force, or it can be configured to move via a motor.

Example of Location Determination

Figure 3:
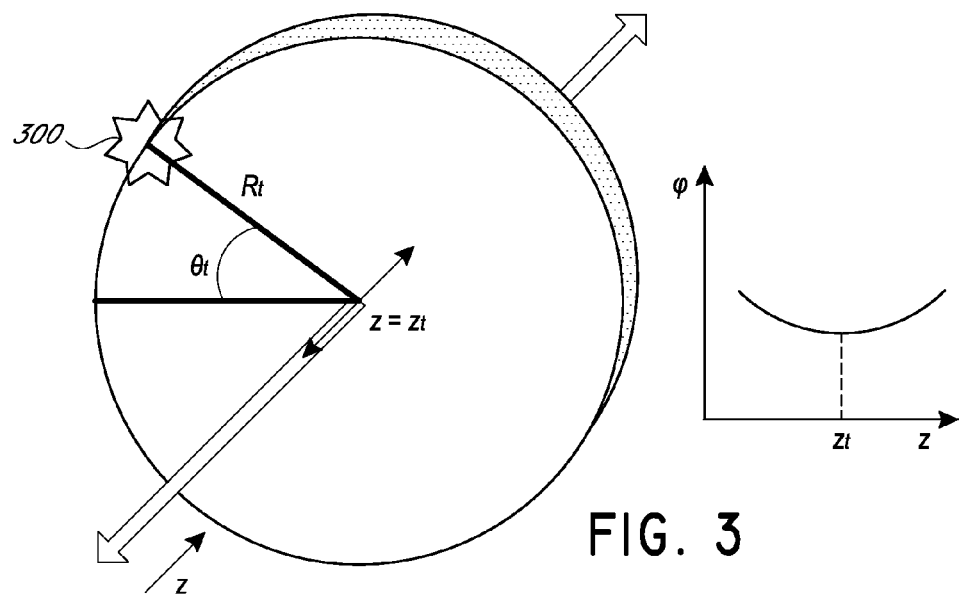
FIGS. 3-5 schematically illustrate example methods for determining locations of electronic tags.
Figure 4:
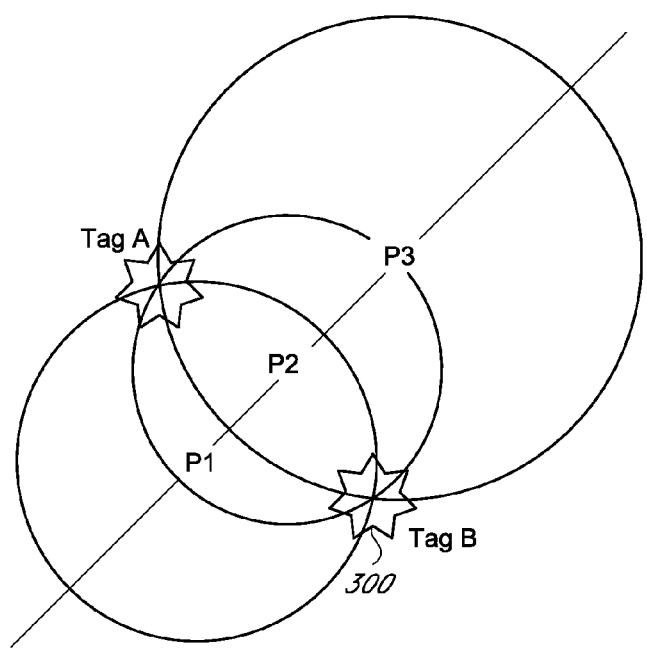
Figure 5:
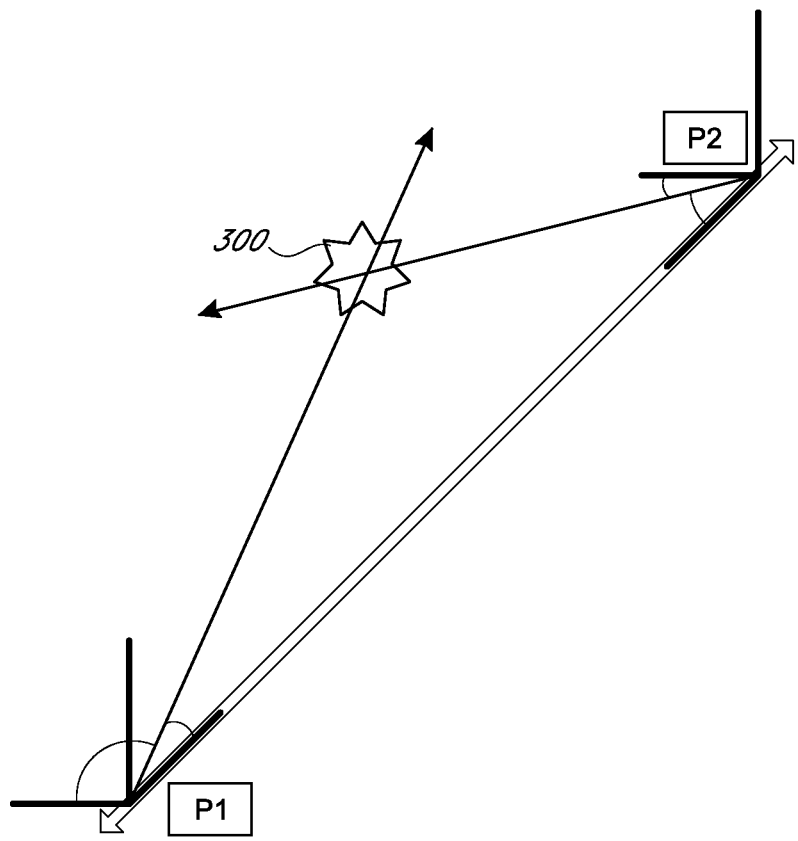

FIGS. 3-5 schematically illustrate example processes for determining the relative location of a passive RFID tag. In some embodiments, to determine the absolute location of a tag within a store, the relative position of the tag with respect to the robot and the position of the robot at the time of detection should be determined. Thus, a step in determining the absolute location of a tag includes knowing the absolute position of the robot at the time of detection, which can be determined using the methods described herein above with reference to FIG. 2A. In some embodiments, location-related RFID tags are affixed to shelves, display cases, floor areas, containers, and the like such that detected tags can be quickly associated with a region defined by the closest location-related RFID tag.

In some implementations, the processes in FIGS. 3-5 are performed by embodiments of the rail-mounted robotic inventory and localizing system 100, described herein in reference to FIG. 1, or by one of its components, such as the rail-mounted robot 105 or the inventory/localizing manager 115. For ease of explanation, the following describes the processes as performed by the robot 105. The examples described below are intended to illustrate, but not limit, various aspects of the rail-mounted robotic inventory/localizing system 100.

In some embodiments, the robot 105 traverses a track or rail. While moving or between movements, the robot 105 detects and records electronic tag IDs and related data, such as radio frequency (RF) characteristics of the communication link with a particular tag and the position of the robot 105 at the time of the communication link. Over the course of a period of time, the robot 105 can be expected to cover the entire length of track, and identify the inventory items within its view and/or determine the location of those inventory items.

The robot 105 can collect information from the tag 300 where the information can include, for example, tag ID number, channel number, date of detection, time of detection, number of reads, or any combination of these. In some embodiments, the antenna can be a steerable or extendable antenna, and the tag information can include information about the relevant angle of the antenna when the antenna read the tag. In some embodiments, the robot 105 can detect and/or record various physical layer characteristics of the communication link between the robot 105 and the tag 300 such as, for example, phase angle, frequency, received signal strength, transmit power, bit error rates, read rate, or any combination of these. These characteristics can provide sufficient information for the robot 105 to estimate, for example, range from the robot 105 to the tag 300, relative motion between the robot 105 and the tag 300, and/or the angle from the robot 105 to the tag 300.

The information collected by the robot 105 can be processed to give an estimate of the location of the tag 300 at a particular time. FIG. 3 illustrates an example method for determining the relative location of a passive RFID tag 300 relative to the robot 105. To calculate the relative location of the tag 300, the robot 105 determines the point of closest approach to the tag 300 along the rail. The robot 105 can compare the phase angles of the return signals from the tag 300 as the robot 105 travels along the rail. The point of closest approach will be where the phase angle ceases to decrease and begins to increase as a function of the distance traveled along the rail. To illustrate this concept, the plot on the right in FIG. 3 shows example measurements of a returned phase angle, $\phi$, as a function of distance traveled along the rail, z. The point where the derivative of the phase angle is 0 is the point of closest approach, labeled $z_t$. The point $z_t$ is the point at which the bore sight of the robot's RFID reader antenna passes the tagged item. Thus, the point $z_t$ represents the position of the tag 300 along the rail.

In some embodiments, the robot 105 includes a steerable antenna configured to steer the RF signal from the robot 105 in a direction perpendicular to the direction of travel. As an example, the steerable antenna can be electronically steerable using a linear phased array of antenna elements. Using the steerable antenna, the robot 105 can obtain the angle of the tag 300 in a plane perpendicular to the direction of travel, $\theta_t$.

The robot 105 can also determine the range, $R_t$, to the tag 300 at the point where the bore sight of its antenna passes the tag 300. The robot 105 can determine the range using suitable range finding techniques. In some implementations, the robot 105 calculates the range based on the returned signal strength from the reflected signal from the tag 300. The robot 105 can vary the power transmitted and read the return signal strength from the tag 300. Based on the transmitted power and the returned signal strength, the robot 105 can estimate the range to the tag 300.

In some implementations, the robot 105 calculates the range based on the phase angles of the reflected signals from the tag 300. For example, the range can be calculated by solving a series of phase angle equations at different frequencies. The phase angle at a given frequency is related to the propagation distance from the robot 105 to the tag 300 and back to the robot 105. The total propagation distance can be represented as an integer number of wavelengths plus a remainder, which corresponds to the phase angle. In a system where the robot 105 transmits signals with a changing frequency, the robot 105 can report the phase angle of the return signal from the tag 300 at a plurality of frequencies. For a given distance between the robot 105 and the tag 300, the phase angle is a linear function of the frequency and the derivative of that function corresponds to the propagation distance.

In some embodiments, the electronic tag is a passive RFID tag that reflects the carrier signal back to the transmitting antenna. The passive RFID tag can be configured to be responsive to signals broadcast in the range of at least about 902 MHz and/or less than or equal to about 928 MHz, or of at least about 865 MHz and/or less than or equal to about 870 MHz. The frequency of the antenna signal can change within the defined range about every 400 ms or less, which conforms to FCC regulations related to signals broadcast in the UHF range between 902 MHz and 928 MHz. Thus, a system that utilizes the UHF signals in that range will transmit at a variety of frequencies that change relatively rapidly. In some embodiments, depending on the spread of frequencies, range can be calculated with reasonable accuracy based on the method described herein above with a plurality of data points, such as at least two data points, at least three data points, at least four data points, or at least five data points. In some embodiments, the frequency of the antenna signal can change within increments of about 10 s or less. In some embodiments, the frequency of the antenna signal can change within increments of about 4 s or less.

Once the robot 105 has determined the point of closest approach to the rail, $z_t$, the angle in the plane perpendicular to the direction of travel, $\theta_t$, and the range of the tag 300 at the point of closest approach, $R_t$, the robot 105 can calculate the relative position of the tag 300. To obtain the absolute position of the tag 300, the robot 105 determines its absolute position within the store. As described above herein with reference to FIG. 2A, the robot 105 can determine its absolute position within the store using a number of methods including using a shaft encoder and knowledge of the track routing through the store, using a wireless location system, and/or using dead reckoning based on internal sensors. Combining the absolute position of the robot 105 and the relative position of the tag 300 gives the absolute position of the tag within the store.

FIG. 4 illustrates another example method of determining the relative position of the tag 300 using trilateration. The robot 105 can determine the range R1 to the tag 300 from a point P1 using the techniques described herein in reference to FIG. 3. The robot can determine the range R2 to the tag 300 from a second point P2. The position of the tag 300 is then the circle or annulus defined by the intersection of the two spheres with radii R1 and R2, respectively. If the rail or track continues in a straight line, determining a third range R3 from a point P3 does not further constrain the possible positions of the tag 300. In some embodiments, the robot 105 can determine the relative position of the tag provided additional information, for example, that the tag is located on a certain plane, such as the floor or a certain shelf. With this additional information, the robot can determine that the tag 300 is in the position of Tag B. This method does not utilize a steerable antenna, which can mean that the robot 105 may be relatively smaller, less expensive, and less complex. This method may be appropriate where a smaller, less expensive robot is desirable and the speed of locating a tagged item is less important.

FIG. 5 illustrates another example method of determining the relative position of the tag 300 using triangulation. In some embodiments, the robot 105 can include a steerable antenna that can be steered in two dimensions. As an example, the robot 105 can include a phased array antenna with a matrix of antenna elements. The robot 105 can calculate the angle to the tag 300 from two or more different positions along the rail. The intersection of the line extensions of those angles from the different measurement points along the rail defines the position of the tag 300 relative to the robot 105. This method advantageously provides the location of tags without calculating any ranges and can be configured to determine a location relatively quickly. This method may be appropriate where the speed of determining locations is important and a relatively larger, more expensive and more complex robot 105 is acceptable.

The methods illustrated in FIGS. 3-5 and described herein can be combined with each other in any permutation. Combining the absolute position of the robot 105 and the relative position of the tag 300 derived from any one or any combination of the above described methods gives the absolute position of the tag within the store.

Several other methods for determining the range to a tag can be used in addition to or instead of the ranging methods described above. These additional methods can add to the accuracy of the determined tag position. In some embodiments, the robot 105 compares the signal strength of a first, unknown electronic tag with a second tag with a known location to determine the range. For example, if the first tag's signal is stronger than the second tag, where the second tag has a determined range, such as about 20 feet, then the robot 105 can estimate that the first tag is closer than this range. The robot 105 can use additional known tags to refine the estimate. For example, if the first tag is weaker than a third tag with a determined range, such as about 10 feet, the robot 105 can refine the estimate to within a first and second range, such as about 10-20 feet. A fourth, fifth, or even more known tags can be used to further refine the estimate.

Other methods can include incrementally varying the power from the reader to an antenna and determining the range based on where the readings from the tag 300 drop out or diminish below a specified signal strength. For example, if half power from the robot's reader 270 corresponds to a detection range of 20 feet, while full power corresponds to a range of 30 feet, the tag signal dropping out at half-power indicates the tag is between 20-30 feet from the robot 105.

In some embodiments, the distance between the robot 105 and the tag 300 can be calculated using phase ranging. For example, phase readings can be collected by monitoring reply signals from the RFID tags corresponding to interrogation signals at multiple frequencies and a common interrogation signal beam direction. The measured phase and frequency data can be compared with theoretical phases calculated with respect to the same frequencies over a range of positions corresponding to a beam extent of the interrogation signal in order to determine the distance.

The location determination techniques described herein above are capable of providing the absolute location of objects in three-dimensional space from a moving platform. The robot 105 can be moving when it reads the tag 300 and determines its position. In some embodiments, the robot 105 can use the return phase angles at multiple transmission frequencies to calculate the range from the tag 300 to the robot 105. The calculations may compensate for the motion of the robot 105 and/or the distortions to the unique phase angle due to the Doppler Effect of the motion.

Example Inventory Routine

Figure 6:
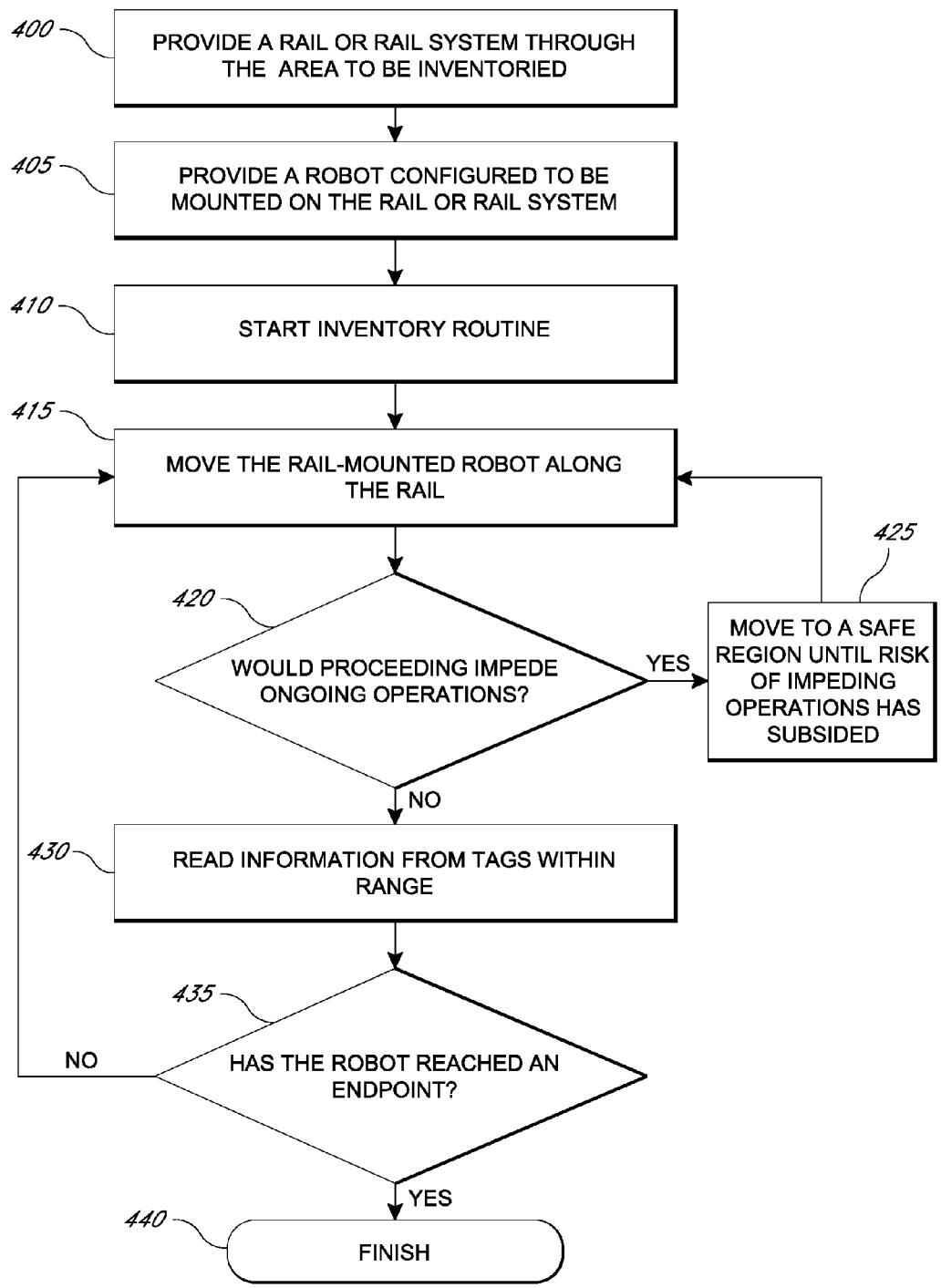
FIG. 6 illustrates a flowchart of an example inventory routine which can be performed by the rail-mounted robotic inventory and locating system of FIG. 1.

FIG. 6 illustrates a flowchart of an embodiment of an inventory routine. The inventory routine or process can be used, for example, by the rail-mounted robotic inventorying/localizing system 100 or other portions of the system 100 illustrated in FIG. 1, such as the rail-mounted robot 105. In some embodiments, the process of FIG. 6 may include fewer or additional blocks and/or the blocks may be performed in a different order than is illustrated. For ease of explanation, portions of the process is described herein as performed by the robot 105; however, the method may be performed wholly or partially by any other suitable computing device or system.

In block 400, a rail or rail system is provided through a majority or all or nearly all of the area to be inventoried. The rail system defines the path of the rail-mounted robot 105 through the store. The rail can be hung from a ceiling, attached to shelving, attached to a wall, attached to a fixture, and can be configured to transition from any structure to another. The rail system can be configured to be straight, curve, change height, or any combination of these. The rail system can be adaptable to alterations in the area to be covered. For example, the rail can be made smaller by removing components of a rail system, can be extended by adding components to the rail system, and/or can be made to have a different course by routing the rail system in a different manner. Providing a rail system can mean installing one or more rail components and/or adapting existing structures, where necessary, to allow the robot 105 to be mounted thereon.

In block 405, the rail-mounted robot 105 is provided to be mounted on the rail system. The robot 105 can be configured to be mounted to the rail using a mount system, friction, electromagnetic forces, clamps, or any other suitable manner that can allow the robot 105 to remain on the rail system while allowing it to traverse the rail system. In some embodiments, the robot 105 includes a mount system 215 as described herein above with reference to FIG. 2B.

In block 410, the inventory routine initiates. In block 415, the robot 105 traverses the rail in a particular direction. The robot 105 can be self-propelled, moving along the rail according to commands from the navigation system. In some embodiments, the robot 105 has a predetermined navigation routine that it follows, that can include when to start and/or stop, travel speed and duration, when to change direction, or any combination of these, based on absolute points or locations or based on conditions perceived by the robot. In some embodiments, the robot 105 can be controlled in whole or in part by a user or operator. The user or operator can issue navigation instructions to the robot, for example, through a remote control, joystick, keyboard, smartphone, computer, audible signals, visual signals, or any combination of these. The robot 105 can comprise a camera, microphone, and/or speaker to facilitate navigation and/or communication within the store. In some embodiments, the robot 105 can have automated navigation routines and manual control capabilities. The movement of the robot 105 can be tracked by the system 100 as it traverses the rail system. The position of the robot 105 can be calculated, determined, and/or recorded in the system 100. As described herein, the position of the robot can be determined using a number of different methods, including dead reckoning, a wireless positional system, and/or shaft encoders combined with knowledge of the rail system route. The position of the robot 105 can be used to determine the absolute location of detected inventory items.

In block 420, the robot 105 can detect possible obstacles along the path. As described herein, the mobile robot 105 can identify and avoid human and/or equipment obstacles. In some embodiments, the robot 105 can use sensors (e.g., the sensors described in FIG. 2A) to detect obstacles. In some embodiments, the robot 105 utilizes RFID readings to identify obstacles. The robot 105 can be configured to detect when proceeding along its path would impede or interfere with ongoing operations. The robot 105 can be configured to train itself to recognize abnormal conditions and respond accordingly. In some embodiments, the robot 105 can compare current inventory and location readings with past readings to decide if there is a possible operation in process. In some embodiments, the robot 105 can detect when it has collided with something. In some embodiments, the robot 105 can compare expected inventory readings with actual readings to decide if equipment is blocking its path. In some embodiments, the robot 105 does not perform obstacle detection and/or avoidance and continues to block 430.

If the robot 105 detects an obstacle and decides that proceeding would cause a collision with an object or interfere with or impede operations, in block 425 the robot 105 can move to a "safe parking" region or other location where that risk is substantially reduced. The "safe parking" region can be designated by the system 100, by a user or operator, and/or it can be determined by the robot 105 through analysis of inventory locations and previous obstacle detection. The "safe parking" region can be any region where the risk of collision with objects and/or impeding or interfering with operations is substantially reduced. In some embodiments, the robot 105 stops its movements when it detects an obstacle. In some embodiments, the robot 105 reverses its direction or changes its speed for a designated distance and/or duration when it detects an obstacle. The robot 105 can stay in one place, return to home, and/or proceed after a specified duration or after defined criteria have been met. In some embodiments, from the "safe parking" region, the robot 105 continues to monitor the location where the obstacle was detected to decide when to proceed along its former route. In some embodiments, the robot 105 waits defined duration before proceeding again. Once the risk of collision and/or interference is gone, or after a specified duration of time, the robot 105 can move along the rail system, returning to block 415.

If the robot 105 decides there are no obstacles, or if it is not configured to detect obstacles, the robot can read tag information of tags that are within range in block 430. The robot 105 collects inventory data on inventory items within its detection range. The robot 105 can continue its movement while reading the information from the tags. In some embodiments, the robot 105 detects RFID tags associated with the inventory items. In some embodiments, the robot 105 determines the position of the tags that it reads. In some embodiments, the robot 105 reports the tag information to the inventory/localizing manager 115, the robotic base station 110, and/or the network 150.

The collected inventory data can include data transmitted from the RFID tags, such as identification data for the inventory items (e.g., item ID, RFID ID or item description), data from the robot 105, and characteristics of communication link between the reader and the tag, such as phase angle, frequency, receive signal strength, transmit power, bit error rates and read rate. For example, the robot 105 can record its current location, the strength of the signal received from the RFID tags, an estimate of the item location, and/or other inventory data.

In some situations, the robot 105 may not be able to detect some items that should be within its detection range. For example, the signal from some RFID tags can be blocked by obstacles in the transmission path, such as shelves, other items, or other objects. However, as the robot moves, the transmission path from the robot to the tags changes, which can allow the robot 105 to detect previously blocked signals.

In block 435, the robot 105 can determine whether it has reached an endpoint. The endpoint can be any point where the robot 105 has been configured to stop taking inventory. For example, the endpoint can be a physical feature, such as where the rail system terminates. As another example, the endpoint can be a point in time such as a time of day or an elapsed time after an inventory operation has begun. As another example, the endpoint can be a command received from the inventory/localizing manager 115, a user input device 145, or some other source. In some embodiments, the robot 105 determines the location of the endpoint. For example, the robot can determine that it has traversed the entire rail system.

In block 440, the robot finishes the inventory routine. In some embodiments, the robot 105 returns to the robotic base station 110 when the inventory routine terminates. In some embodiments, the robot 105 transmits all data related to the inventory routine to the inventory/localizing manager 115, the base station 110, and/or a user computing device upon termination of the routine. In some embodiments, the robot 105 returns to the base station 110 to charge before starting another inventory routine. In some embodiments, the robot 105 can begin another inventory routine after finishing.

Example Functionality of the Rail-Mounted Robotic Inventory/Locating System

The rail-mounted robotic inventory/locating system 100 can be used to perform an inventory scan of a store, warehouse, similar location, or portions of such facilities. The inventory scan can include the rail-mounted robot 105 interrogating electronic tags by transmitting signals from the antennas 272 in the robot 105. The robot 105 can collect inventory data on inventory items within its detection. In some embodiments, the robot 105 detects RFID tags associated with inventory items. The collected inventory data can include any one or any combination of data transmitted from the RFID tags, such as identification data for the inventory items (e.g., item ID, RFID ID or item description), data from the RFID reader 270, and/or characteristics of the communication link between the reader and the tag, such as phase angle, frequency, receive signal strength, transmit power, bit error rates, Doppler shift, time of flight, differential time of flight, and/or read rate. For example, the robot 105 can record the strength of the signal received from the RFID tags, an estimate of the item location, or other inventory data. As part of the inventory routine in some implementations, the robot 105 determines location data for the inventory items. As discussed above in relation to FIGS. 3-5, many different methods can be used to determine the location of the inventory items based on the collected inventory data.

In some embodiments, the rail-mounted robotic inventory/locating system 100 may generate X-Y-Z coordinates (e.g., 3-dimensional coordinates) for the inventory items based on the collected inventory data. The system 100 may assign a confidence score or quality measure to the coordinates that indicate the degree of certainty for each estimated location of the inventory item. The confidence score may also be assigned for embodiments using an X-Y or 2-dimensional coordinate system to identify inventory item locations. The coordinates generated by the system 100 can represent the absolute location of inventory items within the store.

The system 100 can be used to reconcile inventory location or otherwise determine if something is out of place. For example, the system 100 may have received expected location information for the items in the store, and can use that information to identify items that are not in the expected location. This can help the store organize items or find lost items. For example, an inventory clerk can receive a misplaced item report from the system 100 and the inventory clerk, store manager, warehouse employee, or similar person can replace the misplaced items in their correct location.

The system 100 can be used to reconcile inventory. For example, the system 100 can conduct an inventory scan and compare the results of the scan against a previous inventory scan or a downloaded inventory list. The system 100 can be configured to compare these lists and report the results. For example, the system 100 can be configured to indicate to a clerk or manager when a particular item has reached a predetermined level, indicating a possible need to reorder items or restock shelves.

In some embodiments, the system 100 generates expected location information or "golden tag placement" for the items in the store by recording the location of items during an inventorying operation (e.g., the first such operation at the store) and using that expected location information as a baseline for reconciling inventory location during future inventorying operations. For example, the system 100 can determine if items have moved or if the items in the store have changed since its last inventorying operation by comparing a current scan with the golden tag placement. The system 100 can then report those changes to users of the system, such as the inventory clerk, warehouse employee, store manager or other staff who can then add stock or move items back to the intended positions in the store. This capability can be advantageous where a warehouse or other facility is used for multiple purposes, such as a warehouse having a bonded area.

In some embodiments, the rail-mounted robotic inventorying/locating system 100 can be configured to provide electronic article surveillance ("EAS") functionality. The EAS functionality can comprise signaling another system when the position of an article is determined to be outside or inside a defined region. For example, when an article's position is determined to be outside an exit, that article can be checked against recent purchases or similar database. If the article does not appear in that database, the system 100 can interface with an alarm system to trigger an alarm indicating possible theft.

In some embodiments, the system 100 can provide live, real-time zone monitoring capabilities. The overhead system can be configured to track the entrance and exit of all articles within a defined region. For example, the area near the dressing rooms in a clothing store can be flagged as an area to monitor. The system 100 can store and present information related to the articles that have entered the dressing rooms and which have exited. Store personnel can access this information to monitor that area of the store.

In some embodiments, the system 100 can be configured to track the movement of tags. The article tracking configuration can include defining a set of articles to track. In some embodiments, the system 100 can be configured to generate an alert or alarm if one of the identified articles shows that it has been moved at all or is outside or inside a defined region. In some embodiments, the system 100 can track the movement of articles by determining their location at various times. This information can be stored, processed, and/or reported to other systems or users.

Example Embodiments of the Rail-Mounted Robotic Inventory/Localizing System

Figure 7:
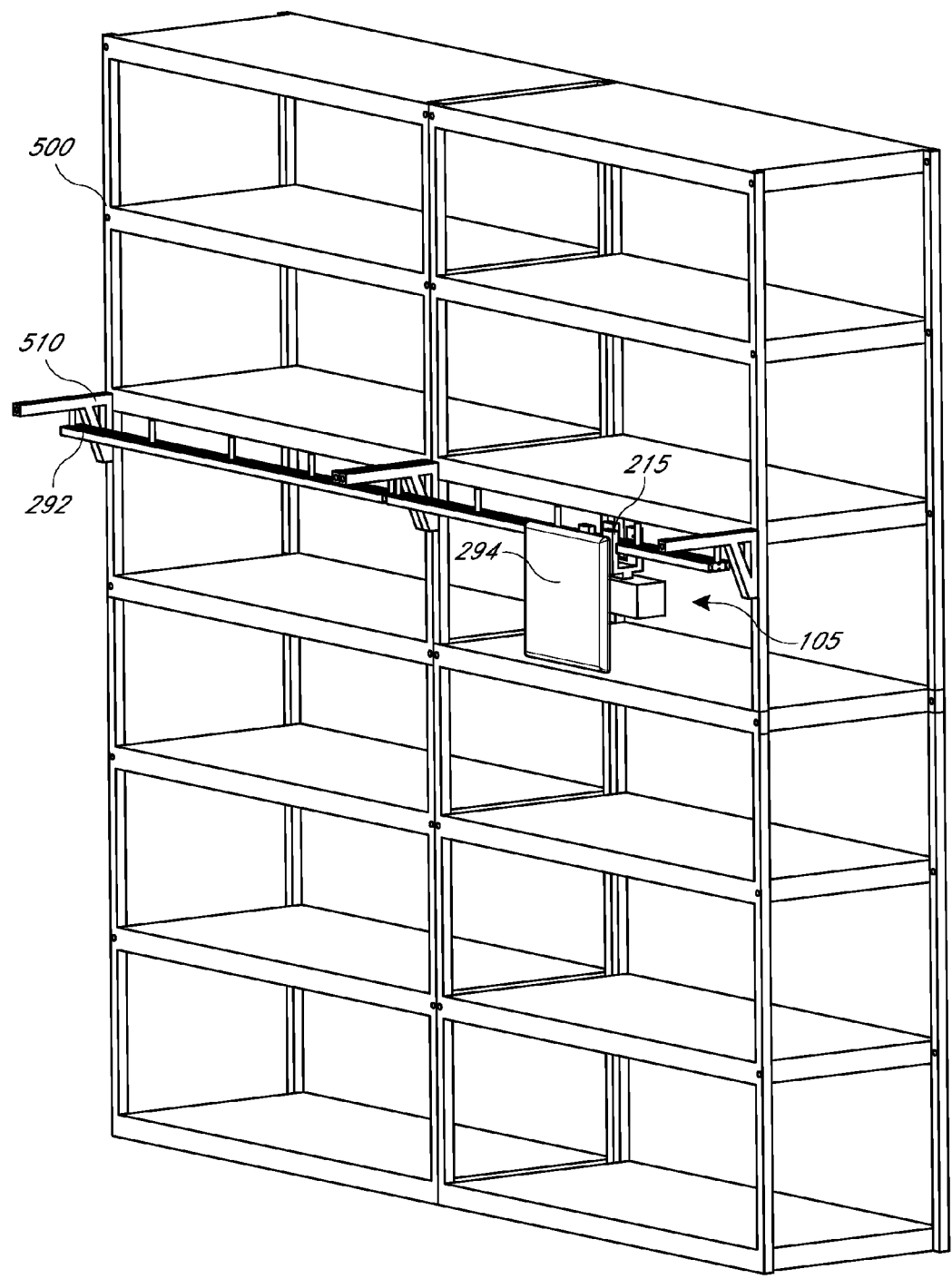
FIG. 7 shows an example embodiment of a rail-mounted robotic inventory and localizing system used to inventory items situated on an opposite side of an aisle.

FIG. 7 shows an example embodiment of a rail-mounted robotic inventory and localizing system 100 used to inventory items situated on an opposite side of an aisle. The rail-mounted robot 105 is configured to detect tags situated on a shelving unit (not pictured) opposite the shelving unit 500 to which the rail 292 is attached. The robot 105 can traverse the length of rail 292 to cover items along the opposite shelving unit the rail in the figure can be a portion of a rail system that extends further than indicated.

The shelving unit 500 can be configured to secure a rail 292 through the use of a rail support structure 510, such as a cantilever attached to the shelving unit 500. The rail support structure 510 can be configured to be suitable for standard high-rack shelving 500, or it can be custom designed for a particular application. The rail system 292 attaches to the rail support structure 510 in a manner that allows the robot 105 to traverse the rail system 292 without being impeded by the rail structure 510. The rail system 292 can be mounted at a height sufficient to avoid high-low forklifts, humans, and/or other customary equipment present in a store, warehouse, storage area, or other similar location. The rail-mounted robot 105 can include a rail mount 215 that is configured to secure the robot 105 to the rail system 292. The robot 105 can include an antenna housing 294 configured to enclose and/or protect one or more antennas or antenna arrays. The antenna housing 294 can be configured to orient the antennas for the desired operation. For example, in FIG. 7 the antennas are directed to the shelving unit (not pictured) opposite the shelving unit 500.

Figure 8:
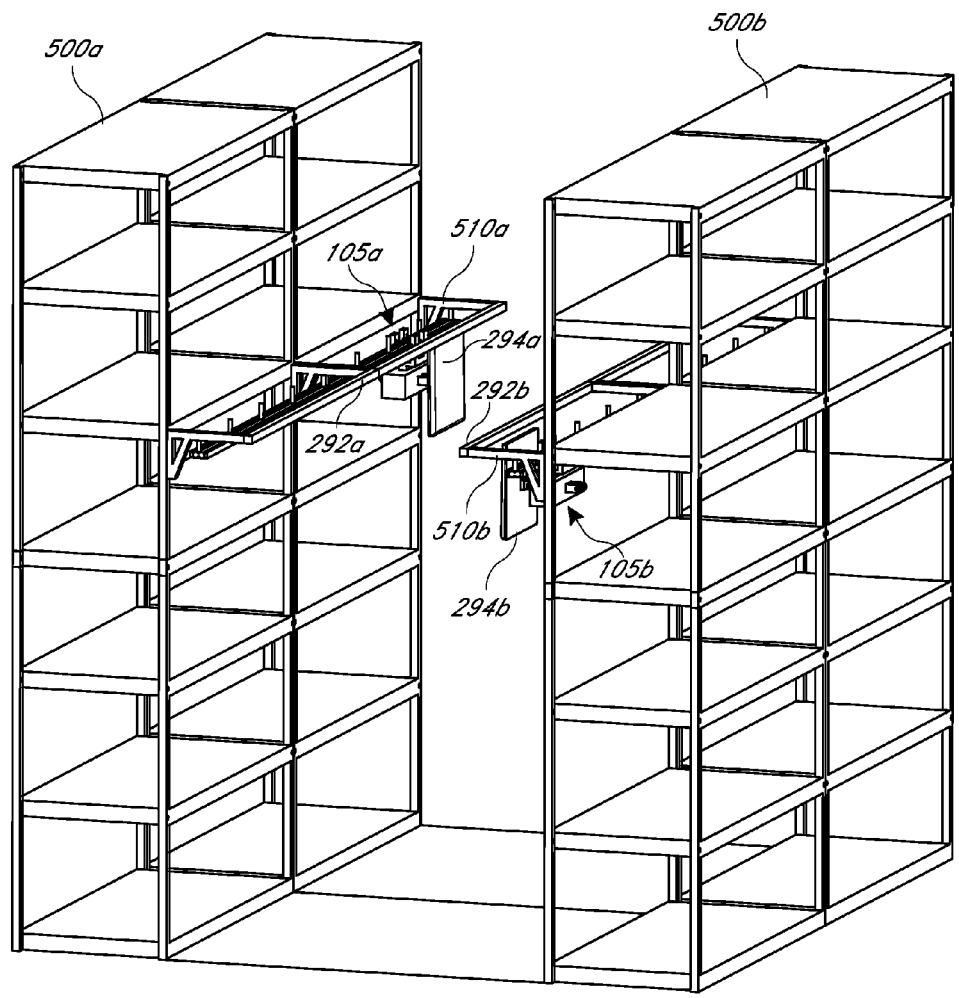
FIG. 8 shows an example embodiment of a rail-mounted robotic inventory and localizing system employing a pair of rail-mounted robots configured to inventory items situated on parallel shelving units.

FIG. 8 shows an example embodiment of a rail-mounted robotic inventory and localizing system 100 employing a pair of rail-mounted robots 105a, 105b configured to inventory items situated on parallel shelving units 500a, 500b. The configuration in FIG. 8 can complement the example embodiment in FIG. 7 so that the system 100 can cover parallel shelving units 500a, 500b.

Figure 9:
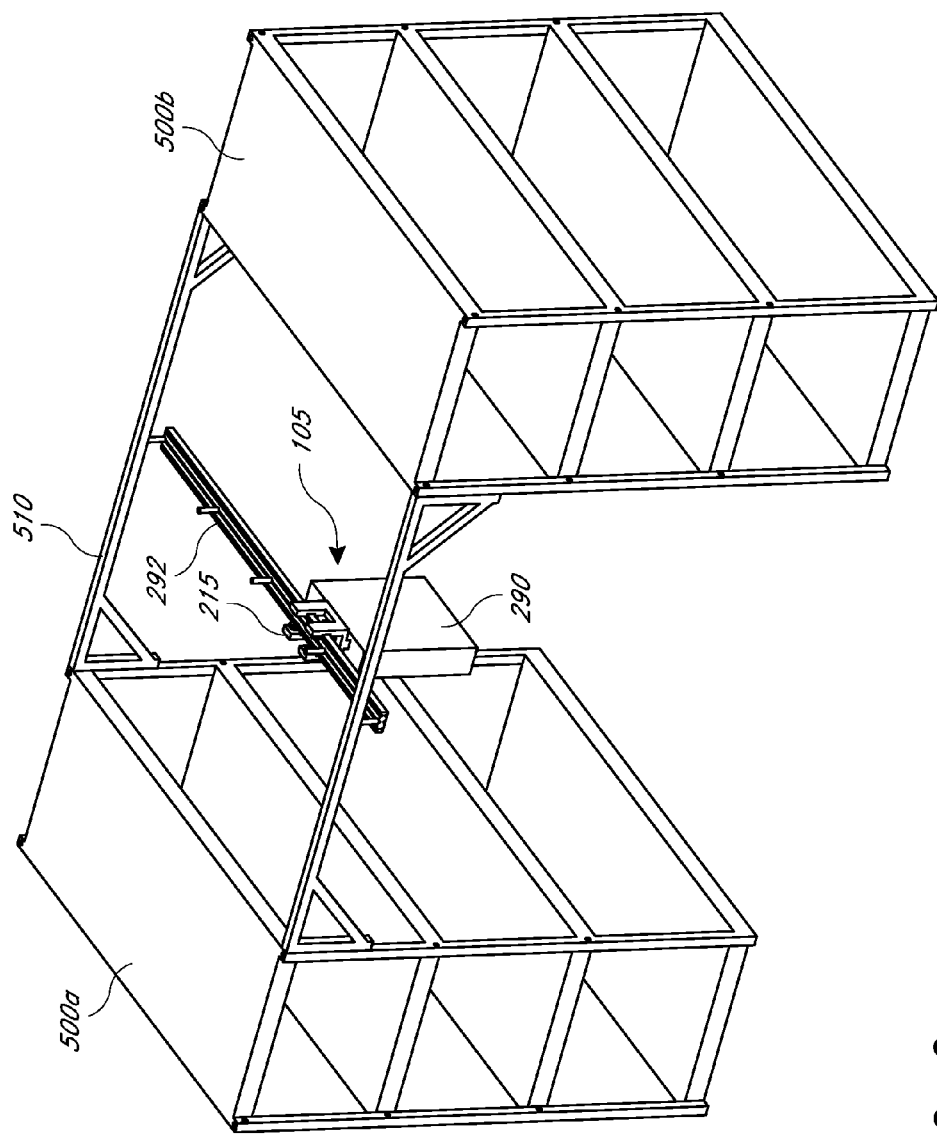
FIGS. 9-10 show example embodiments of a rail-mounted robotic inventory and localizing system where a rail is mounted between shelving units and a single rail-mounted robot performs inventory for items situated on both shelving units.
Figure 10:
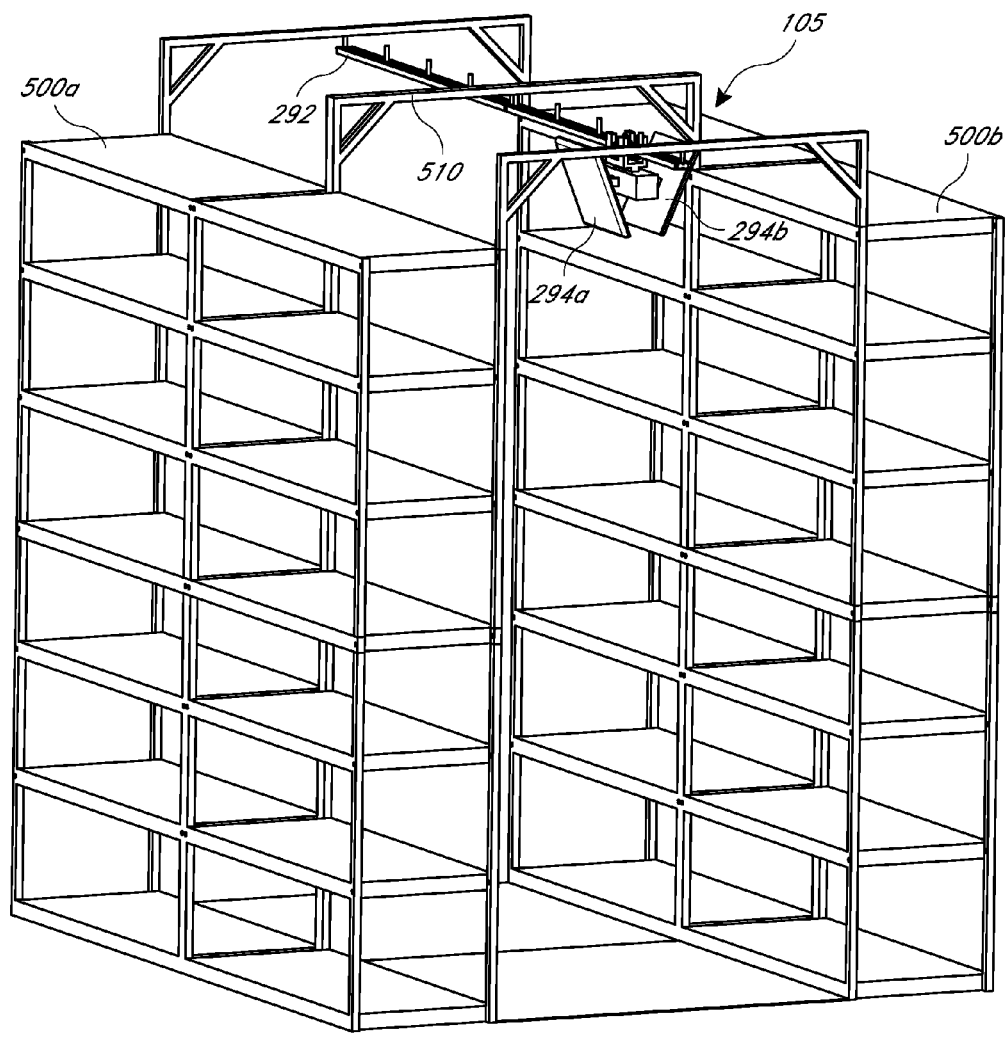

FIGS. 9-10 show example embodiments of a rail-mounted robotic inventory and localizing system 100 where a rail system 292 is mounted between shelving units 500a and 500b and a single rail-mounted robot 105 performs inventory for items situated on both shelving units. The support structures 510 can be configured to be attached to both shelving units 500a and 500b. The rail system 292 can be configured to pass between the shelving units so that the robot can inventory and/or locate items on both.

In FIG. 9, the robot 105 includes antennas and/or antenna arrays within the housing 290. The antennas can be configured to transmit signals to and receive signals from both shelving units 500a and 500b. In FIG. 10, the robot 105 includes two antenna housings 294a and 294b to house two antennas or antenna arrays. The housings are oriented such that the antennas are pointing slightly downward because the robot 105 is situated at the top of the shelving units 500a and 500b. The orientation of the antenna housings 294a and 294b can be configured to achieve the desired coverage based on the location of the inventory items to be read.

Figure 11:
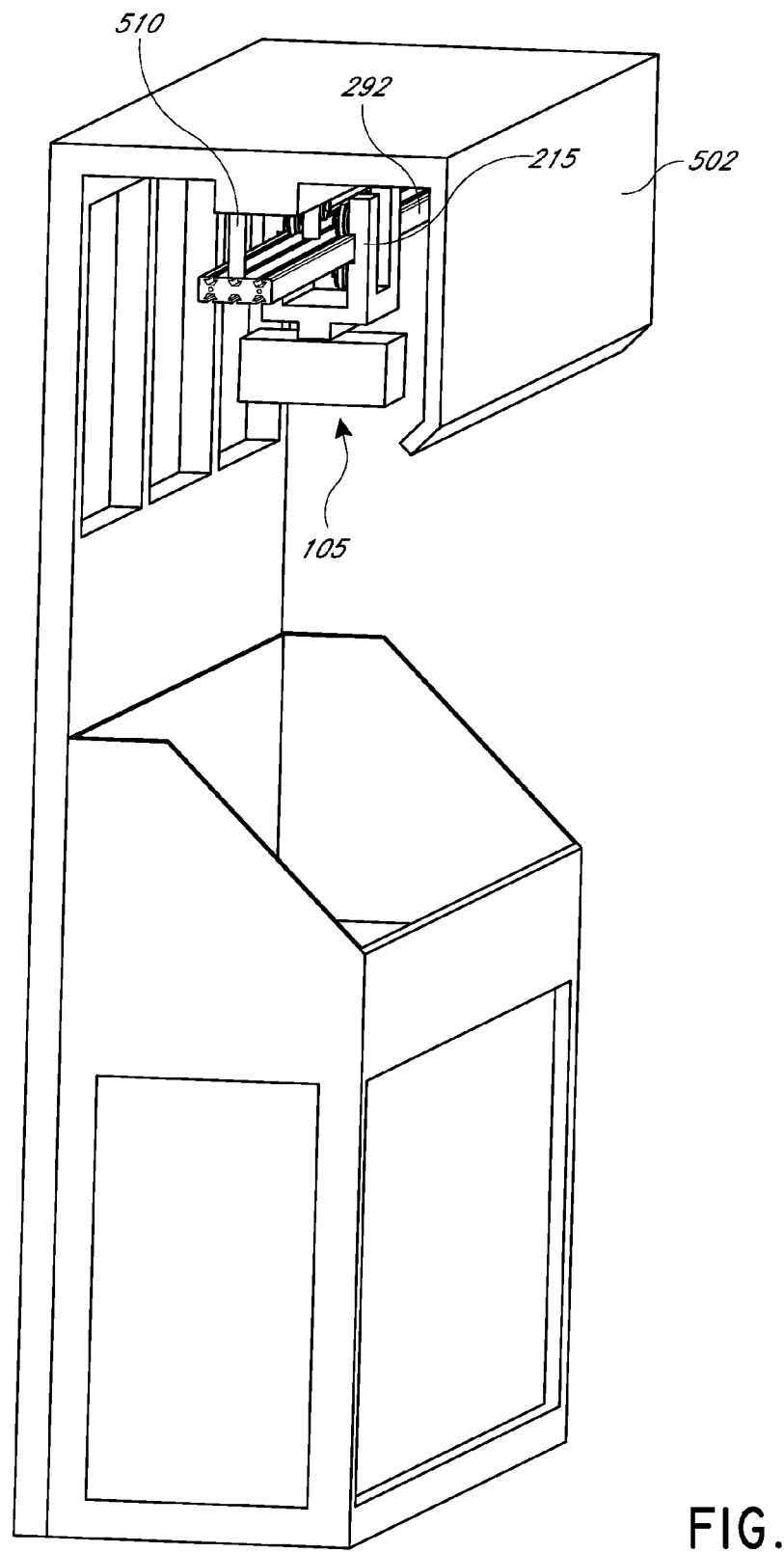
FIG. 11 shows an example embodiment of a rail-mounted robotic inventory and localizing system where a rail-mounted robot is situated above a retail counter and behind a sign, placard, wall, or similar structure.

FIG. 11 shows an example embodiment of a rail-mounted robotic inventory and localizing system 100 where a rail-mounted robot 105 is situated above a retail counter and behind an obscuring barrier such as a sign, placard, wall, lighting valance, soffit, or similar structure 502. The rail support structure 510 can be mounted to the ceiling of the structure 502, as illustrated, or it can be mounted at an angle and/or from the side. The rail system 292 can traverse the entire length of the retail structure 502 or some segment thereof. As above, in some embodiments the rail system 292 illustrated in FIG. 11 is a portion of a longer rail system.

Figure 12:
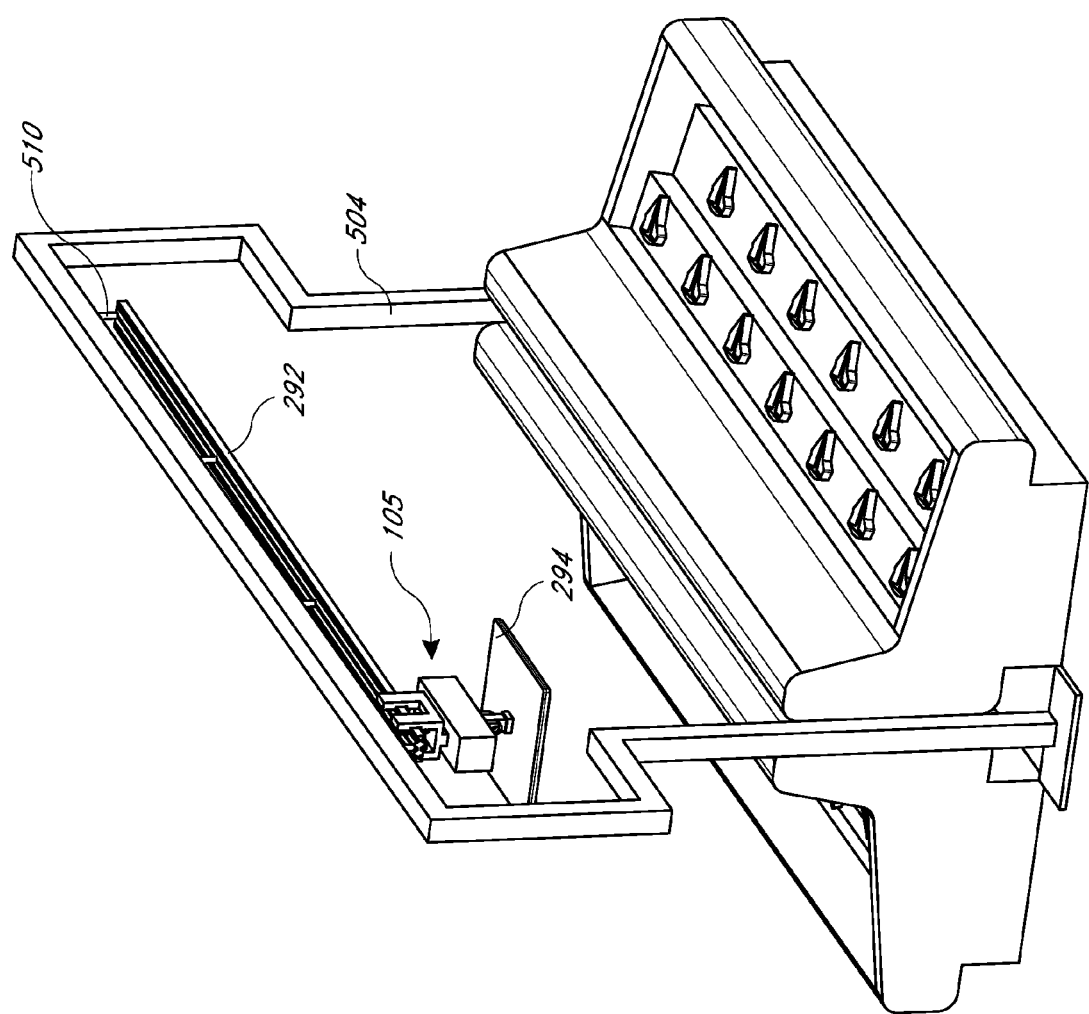

FIG. 12 shows an example embodiment of a rail-mounted robotic inventory and localizing system 100 where a rail-mounted robot 105 is situated above a refrigerator or freezer unit 504 used for items such as meat, dairy products, frozen goods, and the like. The rail support structure 510 can be mounted to an elevated portion of the freezer 504 such that the robot 105 is above the items to be inventoried. The rail system 292 can be configured to traverse the length of the freezer 504. The robot 105 can include an antenna housing 294 pointed down toward the items in the freezer 504.

Figure 13:
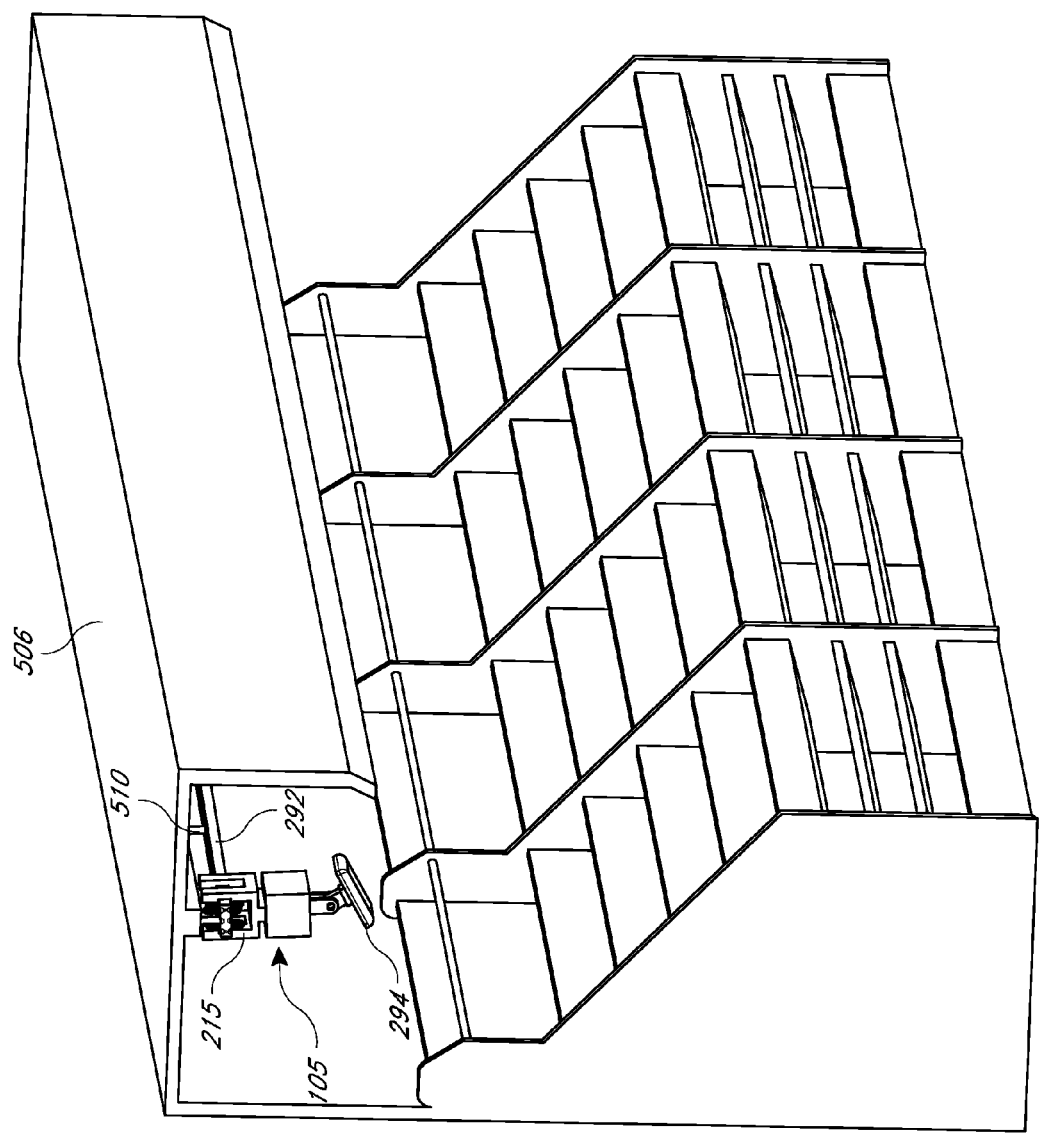

FIG. 13 shows an example embodiment of a rail-mounted robotic inventory and localizing system 100 where a rail-mounted robot 105 is situated above a storage and/or display unit 506 for items such as DVDs, CDs, cards, and the like. In some embodiments, the antenna housing 594 can be oriented to increase and/or maximize the coverage of the robot 105. For example, the antenna housing 594 can be angled to include items in the front of the display unit 504 as well as those toward the rear. In some embodiments, the antenna housing 294 can be configured to pivot and change its relative orientation to change the robot's coverage.

CONCLUSION

Many variations on the rail-mounted robotic inventorying/localizing system 100 described above are possible. For example, while the above description generally describes functions as performed by the rail-mounted robot, at least some of those functions can be performed by the inventory/localizing manager or other component of the inventory and locating system. Likewise, at least some functions described as performed by the inventory/localizing manager system or rail-mounted robotic inventory/localizing system can be performed by the rail-mounted robot. For example, the inventory manager may be incorporated into the robot or the robot can perform at least some calculations or processes for the inventory and locating system using its own onboard systems.

As described above, the rail-mounted robotic inventorying and locating system 100 can be implemented with one or more physical servers or computing machines, such as several computing machines interconnected via a network. Thus, each of the components depicted in the system 100 can include hardware and/or software for performing various features.

The processing of the various components of the inventorying and locating system 100 can be distributed across multiple machines, networks, and other computing resources. Moreover, in some embodiments the connections between the components shown represent possible paths of data flow, rather than actual connections between hardware. While some examples of possible connections are shown, any of the subset of the components shown can communicate with any other subset of components in various implementations. In some embodiments, a robotic RFID reader of a type as disclosed herein can be combined in a system of one or more other types of RFID readers, such as hand-held readers, robotic floor-roving readers, stationary readers (e.g., ceiling-mounted or other elevated readers), etc. A central processor and/or database can combine RFID inventory data from multiple sources for analysis or display.

In some embodiments, the rail-mounted robotic inventorying/localizing system 100 may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

In some embodiments, a server computing system that has components including a central processing unit (CPU), input/output (I/O) components, storage, and memory may be used to execute the inventorying and locating system 100 or specific components of the system 100. The executable code modules of the system 100 can be stored in the memory of the server and/or on other types of non-transitory computer-readable storage media. In some embodiments, the system 100 may be configured differently than described above.

Each of the processes, methods, and algorithms described in the preceding sections may be embodied in, and fully or partially automated by, code modules executed by one or more computers, computer processors, or machines configured to execute computer instructions. The code modules may be stored on any type of non-transitory computer-readable medium or tangible computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. For example, the inventions have been described in the context of RFID readings, but any of the structures, processes, and/or systems can be used singly or together in other contexts, such as in other systems for gathering or disseminating other types of information. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, is not generally intended to imply that features, elements and/or steps are required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

The following is claimed:

1. A rail-mounted robotic inventory system, the system comprising:
    a rail-mounted robot having an electronic tag reader configured to receive electronic tag data from electronic tags associated with inventory items;
    a navigation module configured to:
        direct the rail-mounted robot along a rail through an inventory area;
        detect an obstacle; and
        determine a position of the rail-mounted robot within the inventory area;
    an inventory identification module configured to receive the electronic tag data from the rail-mounted robot and identify the inventory items in the inventory area based at least partly on the electronic tag data;
    wherein the rail-mounted robot is configured to collect multiple readings from one or more of the electronic tags associated with the inventory items, the multiple readings taken at multiple locations along the rail;
    wherein the inventory module is further configured to determine locations of the inventory items within the inventory area based at least partly on the electronic tag data and the position of the rail-mounted robot.

2. The system of claim 1, wherein the navigation module is further configured to direct the rail-mounted robot to avoid the detected obstacle.

3. The system of claim 1, wherein the navigation module comprises a three-axis accelerometer used to detect a collision with the detected obstacle.

4. The system of claim 1, wherein the navigation module is configured to detect the obstacle with the electronic tag reader.

5. The system of claim 1, wherein the inventory module is configured to determine the locations of the inventory items by trilateration.

6. The system of claim 1, wherein the inventory module is configured to determine the locations of the inventory items by triangulation.

7. The system of claim 1, wherein the inventory module is configured to determine the locations of the inventory items based on positions of the inventory items along the rail, ranges of the inventory items from the rail-mounted robot, and angles of the inventory items from the rail-mounted robot.

8. The system of claim 1, wherein the electronic tags are passive RFID tags.

* * * * *